US009817662B2

(12) United States Patent
Jorgensen

(10) Patent No.: US 9,817,662 B2
(45) Date of Patent: Nov. 14, 2017

(54) APPARATUS FOR CALCULATING AND RETAINING A BOUND ON ERROR DURING FLOATING POINT OPERATIONS AND METHODS THEREOF

(71) Applicant: Alan A Jorgensen, Las Vegas, NV (US)

(72) Inventor: Alan A Jorgensen, Las Vegas, NV (US)

(*) Notice: Subject to any disclaimer, the term of this patent is extended or adjusted under 35 U.S.C. 154(b) by 0 days.

(21) Appl. No.: 15/331,901

(22) Filed: Oct. 23, 2016

(65) Prior Publication Data

US 2017/0115986 A1 Apr. 27, 2017

Related U.S. Application Data

(60) Provisional application No. 62/246,021, filed on Oct. 24, 2015, provisional application No. 62/277,137, filed on Jan. 11, 2016, provisional application No. 62/375,422, filed on Aug. 15, 2016.

(51) Int. Cl.
| | |
|---|---|
| *G06F 9/30* | (2006.01) |
| *G06F 7/48* | (2006.01) |
| *G06F 7/483* | (2006.01) |
| *G06F 7/499* | (2006.01) |

(52) U.S. Cl.
CPC ............ *G06F 9/3001* (2013.01); *G06F 7/483* (2013.01); *G06F 7/49947* (2013.01); *G06F 9/30101* (2013.01)

(58) Field of Classification Search
CPC ...................................................... G06F 7/483
USPC ........................................................ 708/495
See application file for complete search history.

(56) References Cited

U.S. PATENT DOCUMENTS

| | | |
|---|---|---|
| 3,037,701 A | 6/1962 | Sierra |
| 3,701,976 A | 12/1972 | Shively |
| 4,367,536 A | 1/1983 | Vignes et al. |

(Continued)

OTHER PUBLICATIONS

Monniaux, David, The pitfalls of verifying floating-point computations, ACM Transactions on Programming Languages and Systems, 2008, pp. 12:1-12:41, vol. 30, No. 3.

(Continued)

*Primary Examiner* — Andrew Caldwell
*Assistant Examiner* — Michael Metzger
(74) *Attorney, Agent, or Firm* — Connie R. Masters

(57) ABSTRACT

The apparatus and method for calculating and retaining a bound on error during floating point operations inserts an additional bounding field into the standard floating-point format that records the retained significant bits of the calculation with notification upon insufficient retention. The bounding field, which accounts for both rounding and cancellation errors, has two parts, the lost bits D Field and the accumulated rounding error R Field. The D Field states the number of bits in the floating point representation that are no longer meaningful. The bounds on the real value represented are determined from the truncated floating point value (first bound) and the addition of the error determined by the number of lost bits (second bound). The true, real value is absolutely contained by the first and second bounds. The allowed loss (optionally programmable) of significant bits provides a fail-safe, real-time notification of loss of significant bits.

9 Claims, 10 Drawing Sheets

(56) References Cited

U.S. PATENT DOCUMENTS

| | | | |
|---|---|---|---|
| 4,597,044 A * | 6/1986 | Circello | G06F 12/109 |
| | | | 711/200 |
| 4,926,370 A | 5/1990 | Brown et al. | |
| 5,954,790 A | 9/1999 | Wong | |
| 5,963,461 A | 10/1999 | Gorshtein et al. | |
| 6,073,155 A * | 6/2000 | Inabata | G06F 7/485 |
| | | | 708/490 |
| 6,108,772 A * | 8/2000 | Sharangpani | G06F 7/483 |
| | | | 708/500 |
| 6,175,847 B1 | 1/2001 | Brooks et al. | |
| 6,816,777 B2 | 11/2004 | Koto et al. | |
| 7,698,353 B2 | 4/2010 | Tan et al. | |
| 7,774,393 B1 | 8/2010 | Brooks et al. | |
| 8,370,226 B1 | 2/2013 | Bhatt | |
| 9,335,996 B2 | 5/2016 | Naeimi et al. | |
| 2007/0260665 A1 * | 11/2007 | Wang | G06F 7/483 |
| | | | 708/498 |
| 2012/0215823 A1 | 8/2012 | Lutz | |
| 2014/0172936 A1 | 6/2014 | Tomono et al. | |
| 2014/0188968 A1 * | 7/2014 | Kaul | G06F 7/483 |
| | | | 708/501 |

OTHER PUBLICATIONS

Goldberg, David, What Every Computer Scientist Should Know About Floating-Point Arithmetic, ACM Computing Surveys, 1991, pp. 5-48, vol. 23, No. 1.

Masotti, G., Floating-Point Numbers with Error Estimates (revised), (Published on-line at http://arxiv.org/ftp/arxiv/papers/1201/1201.5975.pdf, Accessed Jun. 28, 2015), 2012.

Muller, et al., Handbook of Floating-Point Arithmetic, ISBN 978-0-8176-4705-6, Birkhauser Basel, 2010, pp. 3-12.

* cited by examiner

APPARATUS FOR CALCULATING AND RETAINING A BOUND ON ERROR DURING FLOATING POINT OPERATIONS AND METHODS THEREOF

CROSS-REFERENCE TO RELATED APPLICATIONS

This nonprovisional application claims the benefit of U.S. Provisional Patent Application No. 62/246,021 filed on Oct. 24, 2015, U.S. Provisional Patent Application No. 62/277,137 filed on Jan. 11, 2016, and U.S. Provisional Patent Application No. 62/375,422 filed on Aug. 15, 2016, which are incorporated herein in their entirety.

FIELD OF INVENTION

This invention relates generally to logic circuits that perform certain floating point arithmetic operations in a floating point processing device and, more particularly, methods or arrangements for processing data by operating upon the order or content of the data to calculate and retain a bound on error introduced through alignment and normalization.

BACKGROUND OF THE INVENTION

In the design of floating point arithmetic systems for use in a floating point processing device, it is desirable that results are consistent to achieve conformity in the calculations and solutions to problems even though the problems are solved using different computer systems.

An American national standard has been developed in order to provide a uniform system of rules for governing the implementation of floating point arithmetic systems. This standard is identified as IEEE Standard No. 754-2008 and international standard ISO/IEC/IEEE 60599:2011, which are both incorporated by reference herein. The standard specifies basic and extended floating point number formats, arithmetic operations, conversions between integer and floating point formats, conversions between different floating point formats, conversions between basic format floating point numbers and decimal strings, and the handling of certain floating point exceptions.

The typical floating point arithmetic operation may be accomplished using formats of various (usually standard) widths (for example, 32-bit, 64-bit, etc.). Each of these formats utilizes a sign, exponent and fraction field (or significand), where the respective fields occupy predefined portions of the floating point number. For example, in the case of a 32-bit single precision number the sign field is a single bit occupying the most significant bit position; the exponent field is an 8-bit quantity occupying the next-most significant bit positions; the fraction field occupies the least significant 23-bit positions. Similarly, in the case of a 64-bit double precision number the sign field is a single bit, the exponent field is 11 bits, and the fraction field is 52 bits. Additional formats provide the same information, but with varied field widths, with larger field widths providing the potential for greater accuracy and value range.

After each floating point result is developed, it must be normalized and then rounded. When the result is normalized, the number of leading zeros in the fraction field is counted. This number is then subtracted from the exponent, and the fraction is shifted left until a "1" resides in the most significant bit position of the fraction field. Certain floating point answers cannot be normalized because the exponent is already at its lowest possible value and the most significant bit of the fraction field is not a "1." This is a "subnormal number" with fewer significant digits than a normalized number.

In designing the hardware and logic for performing floating point arithmetic operations in conformance with this standard, it is necessary and desirable to incorporate certain additional indicator bits into the floating point hardware operations. These indicator bits are injected into the fraction field of the floating point number, and are used by the arithmetic control logic to indicate when certain conditions exist in the floating point operation. In non-subnormal (normalized) numbers, for example, an "implicit" bit (generally referred to as the "hidden bit") is created by the arithmetic control logic when the exponent of the floating point number has a nonzero value. This "hidden bit" is not represented in the storage format, but is assumed. It is inserted at the time a floating point number is loaded into the arithmetic registers and occupies the most significant bit position of the fraction field of the number. During addition, a single "guard" bit is set by the floating point control logic during certain arithmetic operations, as an indicator of the loss of significant bits of the floating point number being processed. The guard bit is set when a right shift, required for normalization, shifts a bit from the right side of the fraction field capacity. The guard bit occupies a portion of the fraction field. Finally, a "sticky" bit is set in certain floating point arithmetic operations as an indicator that the floating point number has lost some significant bits.

These extra bits in the fraction field are used exclusively for rounding operations, after the result has been normalized. The guard bit is treated as if it is a part of the fraction and is shifted with the rest of the fraction during normalization and exponent alignment and is utilized by the arithmetic. The sticky bit is not shifted with the fraction, but is utilized by the arithmetic. It acts as a "catcher" for bits shifted off the right of the fraction; when a 1 is shifted off the right side of the fraction, the sticky bit will remain a 1 until normalization and rounding are finished.

There are typically four modes of rounding, as follows: (1.) round to nearest; (2.) round to positive infinity; (3.) round to negative infinity; and (4.) round to zero. Each of these may introduce error into the calculation.

Though this standard is widely used and is useful for many operations, this standard defines "precision" as the maximum number of digits available for the significand of the real number representation and does not define precision as the number of correct digits in a real number representation. Neither does this standard provide for the calculation and storage of error information and therefore permits propagation of error including the potential loss of all significant bits. These problems in the current standard can lead to substantial accumulated rounding error and catastrophic cancellation error. Cancellation occurs when closely similar values are subtracted, and it injects significant error without a corresponding indication of this error in the result.

Various authors have contributed to the standard or noted these significant problems, but the problem persists.

U.S. Pat. No. 3,037,701 to Sierra issued in 1962 establishes the basis for hardware to perform fixed word length floating point arithmetic including normalization, rounding, and zero conversion. The Sierra patent describes the potential for introducing error in floating point operations including total loss of useful information. No method is described for calculating or retaining error information of any type.

In 2010, in his book *Handbook of Floating-Point Arithmetic*, Muller et al. describe the state-of-the-art of the application of floating point including the ISO/IEC/IEEE 60599:2011 and describe error problems. They state, "Sometimes, even with a correctly implemented floating-point arithmetic, the result of a computation is far from what could be expected."

In 1991, David Goldberg, in "What Every Computer Scientist Should Know About Floating-Point Arithmetic," provides a detailed description and mathematical analysis of floating point error. This paper describes rounding error (p. 6), relative error and error units in the last place (Ulps) (p. 8), the use of guard digits (p. 9), and cancellation error types, both catastrophic and benign (p. 10). Recommended error mitigation is limited to extending precision (again defined as digits available for real number representation) requiring additional storage space for computational results (p. 17) and numerical error analysis of a given problem to determine the method of computation to minimize and limit the error introduced by the computation.

Thus, many authors have acknowledged the existence of these types of errors in the current standard for floating point operations. In response, numerous attempts to address these significant problems have been made.

In 2012 in the article "Floating-Point Numbers with Error Estimates," Glauco Masotti describes adding a data structure to standard floating point format to contain statistical estimates of the accumulated floating point error. This technique increases required storage space, adds computation time, and does not provide bounds for the error.

In 2008 in "The Pitfalls of Verifying Floating-Point Computations," David Monniaux presents the limitations on static program analysis to determine the expected error generated by code to perform a sequence of floating point operations. However, static error analysis is prone to error and relies on and assumes a lengthy and expensive algorithm error analysis to ensure that the algorithm will provide sufficiently accurate results.

In summary, the current state-of-the-art does not retain error information within the associated floating point data structure. At present, any retention of bounds on floating point error requires significantly more memory space and computation time (or correspondingly more hardware) to perform error interval computations.

Further, in the current standard, when two values are compared by subtraction in which cancellation occurs, program flow decisions based on this erroneous comparison can result in an incorrect decision. No validity of the resulting comparison is provided by the standard conventions.

Importantly, the standard provides no indication when the result of a computation no longer provides a sufficient number of significant digits.

Additionally, conversion from external to internal format or conversion between floating point formats may inject an error in the initial representation of a real number without recording that error.

Further, floating point values are converted to external representation without indication of loss of significant bits even if no significant bits remain in the output data.

Notably, current technology does not permit allowing programmers to specify the number of required retained significant digits.

Thus, the various methods provided by the current art for floating point error mitigation have unresolved problems. Accordingly, there is a need for an apparatus and method for calculating and retaining a bound on error during floating point operations.

The discussion above is merely provided for general background information and is not intended to be used as an aid in determining the scope of the claimed subject matter.

SUMMARY OF THE INVENTION

The present invention is directed to a floating point processing device and associated methods for calculating and retaining a bound on error during floating point operations by the insertion of an additional bounding field into the ANSI/IEEE 754-2008 standard floating-point arithmetic format. This bound B Field has two major parts, the lost bits field (D Field) and the accumulated rounding error field (N Field). The N Field is subsequently divided into the rounding bits field (R Field) and the rounding error count field (C Field), representing the sum of the carries from the sum of the R Fields. The lost bits D Field is the number of bits in the floating point representation that are no longer significant. The bounds on the real value represented are determined from the truncated (round to zero) floating point value (first bound) and the addition of the error determined by the number of lost bits (second bound). This lost bits D Field is compared to the (optionally programmable) unacceptable loss of significant bits to provide a fail-safe, real-time notification of the loss of significant bits.

The C Field of the floating point format of the present invention, which is the sum of the carries from the sum of the R Fields. (The term "field" refers to either a portion of a data structure or the value of that portion of the data structure, unless otherwise contextually defined.) When the extension count exceeds the current lost bits, one is added to the lost bits and the C Field is set to one. The R Field is the sum of the rounded most significant bits of the rounding error, lost during truncation.

The apparatus and method of the current invention can be used in conjunction with the apparatus and method implementing the current floating point standard. Conversion between the inventive format and the current format can be accomplished when needed; therefore, existing software that is dependent upon the current floating point standard need not be discarded. The new bounding field is added to the conventional floating point standard to provide accumulated information for the bound of the error that delimits the real number represented.

Current standards for floating point have no means of measuring and/or recording floating point rounding and cancelation error. The present invention provides an apparatus and method that classifies (as acceptable or as not acceptable) the accumulated loss of significant bits resulting from a floating point operation. This is done by comparing the loss of significant bits of the current operation against the unacceptable limit of the loss of significant bits. The unacceptable limits for different widths of floating point numbers can be provided in two ways, hardware or programmable. The hardware provides a default value. For example, in single precision (32-bit), the default value could require 3 significant decimal digits, which necessitates that the significand retains 10 significant bits. In a 64-bit double precision example, the default value could require 6 significant decimal digits, which necessitates that the significand retains 20 significant bits. The second way to provide the unacceptable limit is by a special floating point instruction that sets the limit on the error bound for the specified precision. The current invention provides a means of measuring, accumulating, recording, and reporting these errors, as well as optionally allowing the programmer to designate an unacceptable amount of error.

This is an advantage over the current technology that does not permit any control on the allowable error. The current invention not only permits the detection of loss of significant bits, but optionally allows the number of required retained significant digits to be specified.

When the loss of significant bits is greater than or equal to the unacceptable limit, an inventive signaling NaN that signals insufficient significant bits, termed "sNaN(isb)," is generated indicating that the result no longer has the required number of significant bits. This is in contrast to the current technology, which does not provide an indication when the result of a computation no longer provides a sufficient number of significant bits.

In contrast to the conventional floating point standard, which does not retain error information within the associated floating point data structure, the present invention provides error information in the lost bits D Field within the floating point data structure. Two bounds are provided. The first bound is the real number represented by the exponent and the truncated significand, and the second bound is determined by adding to the first bound a maximum error value represented by the lost bits D Field.

Using current technology error can be reduced by increasing computation time and/or memory space. The present invention provides this error information within the inventive data structure with little impact on space and performance.

In the standard floating point implementation cancellation injects significant error without a corresponding indication in the result. In contrast, the present invention accounts for cancellation error in the lost bits D Field.

The instant invention provides a method of recording the error injected by the conversion of an external representation to the inventive internal representation (or of recording the error in conversion between internal representations).

Currently floating point values are converted to external representation without indication of loss of significant digits even when no significant bits exist. In contrast, the current invention provides the inventive signaling Not-a-Number, sNaN(isb) when insufficient significant bits remain.

In the current art, static error analysis requires significant mathematical analysis and cannot determine actual error in real time. This work must be done by highly skilled mathematician programmers. Therefore, error analysis is only used for critical projects because of the greatly increased cost and time required. In contrast, the present invention provides error computation in real time with, at most, a small increase in computation time and a small decrease in the maximum number of bits available for the significand.

The dynamic error analysis by means of error injection, used in the current technology, has similar problems requiring multiple execution of algorithms that require floating point. Such techniques would be of little use when using adaptive algorithms or when error information is required in real time. The present invention eliminates the need for multiple execution and provides error information in real time.

Adding additional storage to retain statistical information on error, which is a commonly proposed solution, significantly increases computation time and required storage. The present invention makes a slight decrease in the maximum number of bits available for the significand for real number representation in order to accommodate space for error information. The storage space required by the present invention is the same as standard floating point.

Though interval arithmetic provides a means of computing bounds for floating point computations, it requires greatly increased computation time and at least twice as much storage. In contrast, the present apparatus for calculating and retaining a bound computes both the first and second bounds on the real number represented and does this within the execution of a single instruction. Additional memory is not required. The computed bounds are fail safe.

An object of the present invention is to bound floating point error when performing certain floating point arithmetic operations in a floating point processing device.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Figure 1:
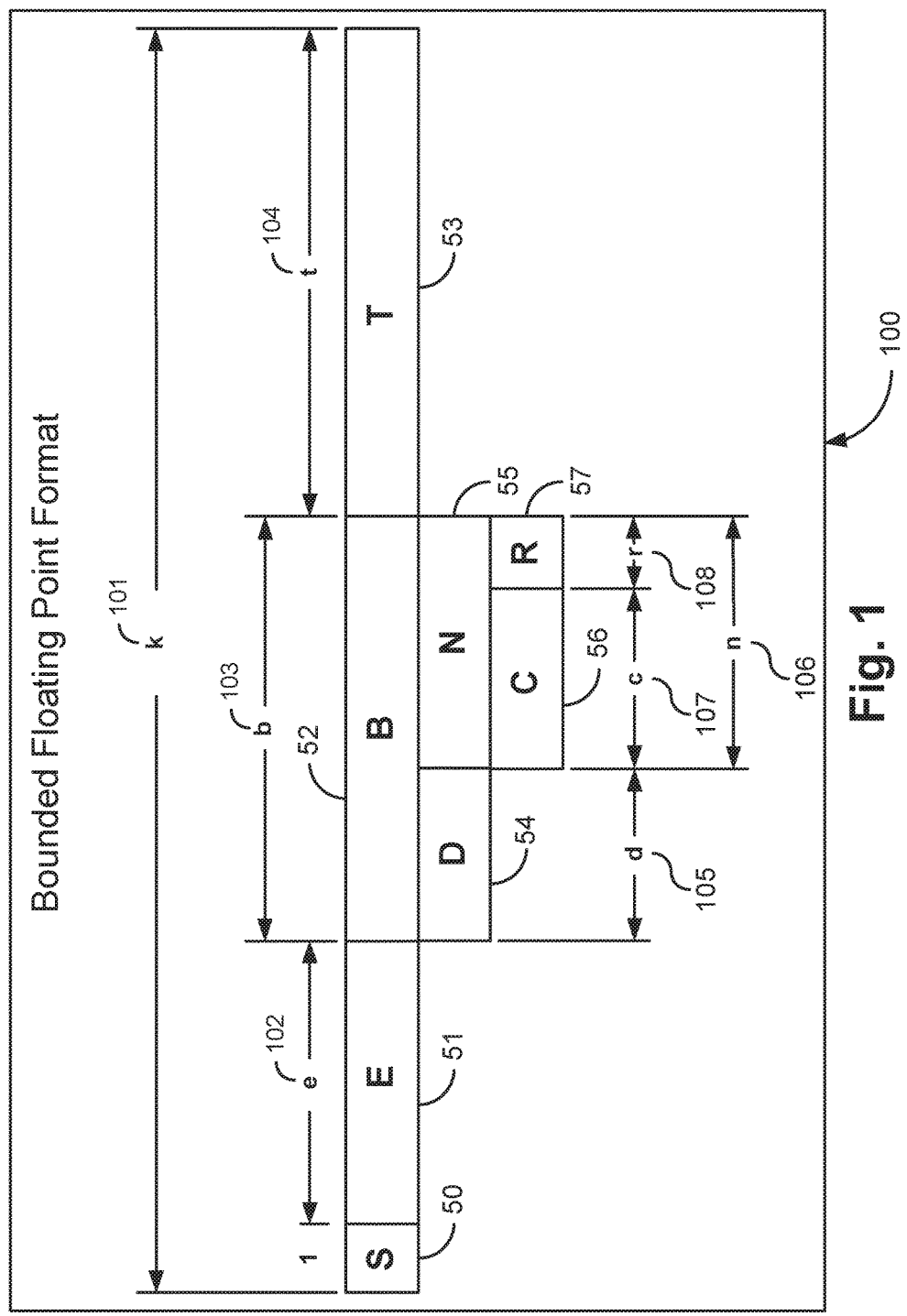
FIG. 1 is a diagram of the inventive bounded floating point format showing the new bound B Field of the present invention which is composed of the lost bits D Field and the N Field, where the N Field is, in turn, composed of the C Field and the R Field.
Figure 2A:
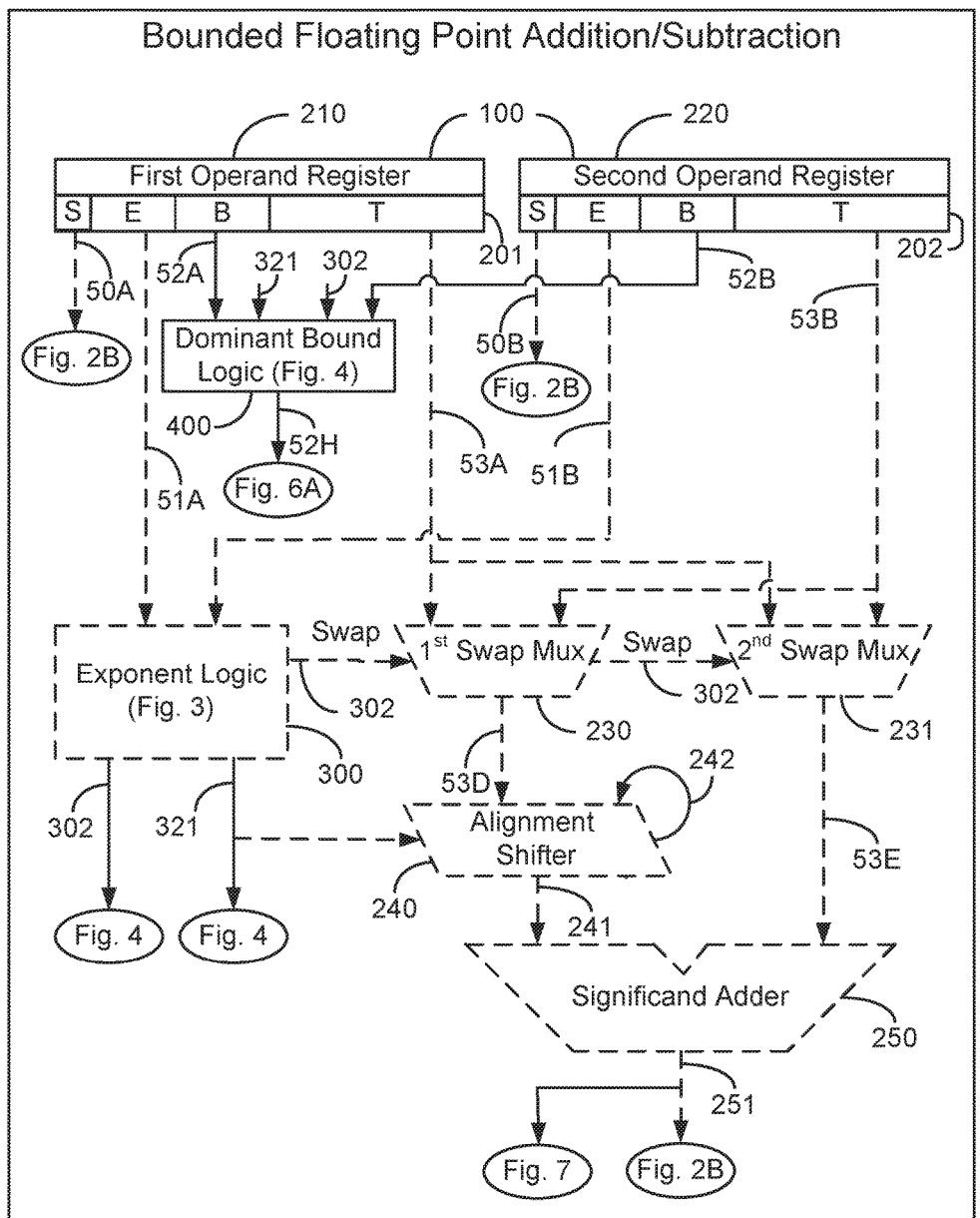
FIGS. 2A-2B is a diagrammatic example of the logic and control of the floating point operation showing the inventive error bounding in an exemplary addition or subtraction operation.
Figure 2B:
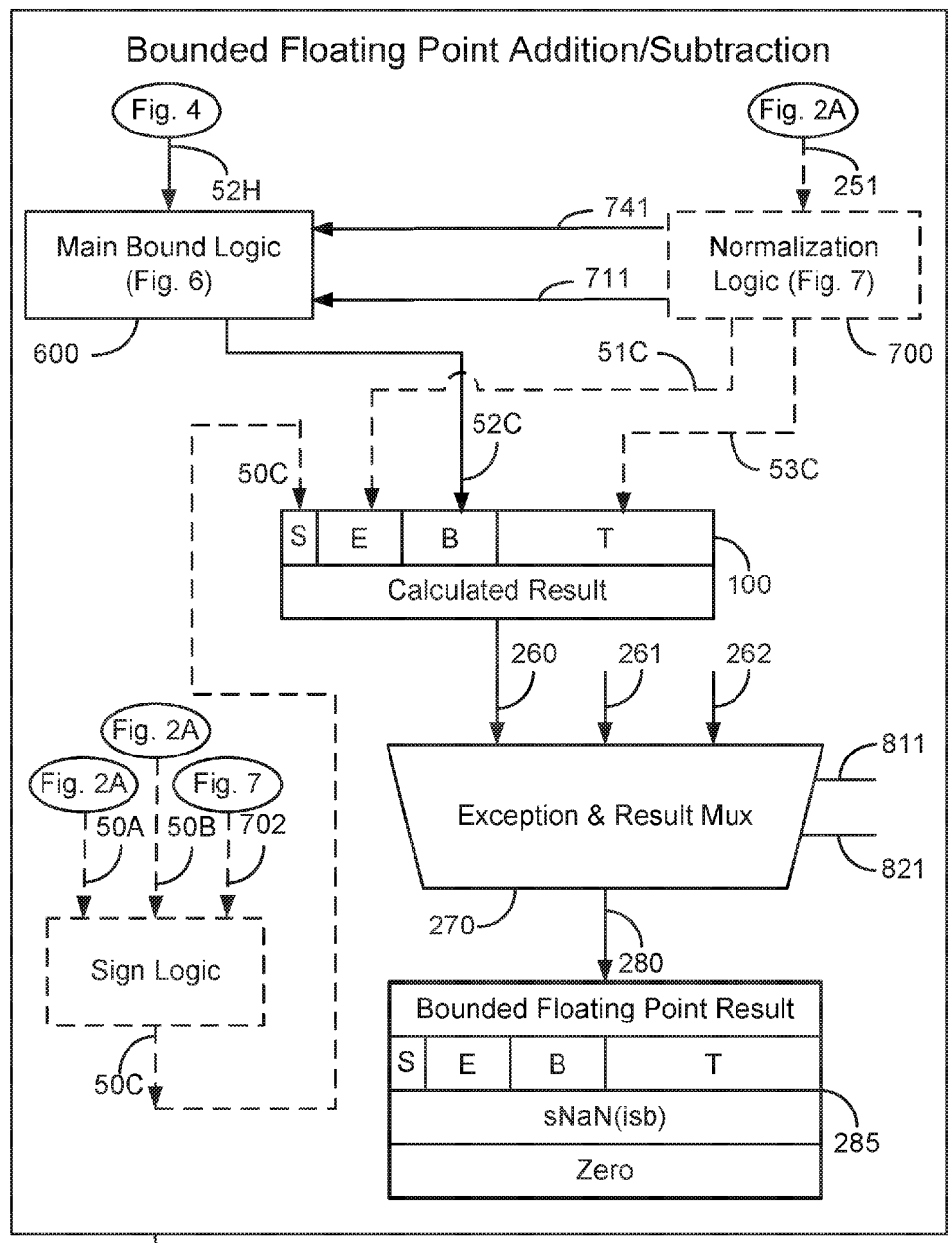

Shown throughout the figures, the present invention is directed toward a bounded floating point system 900 including a bounded floating point processing unit (BFPU) 950 and method for calculating and retaining a bound on error during floating point operations, an example of which is shown generally as reference number 200 (FIGS. 2A-2B). In contrast to the standard floating point implementation that introduces error without notification or warning, the present bounded floating point format 100 provides a new error bound B Field 52 (FIG. 1) that identifies and records a bound on the error and enables notification of loss of significant bits via replacement of the result with an inventive sNaN(isb) 262, when insufficient significant bits remain.

Using the current floating point standard, error can be introduced during alignment or normalization. In the inventive apparatus and method, normalization during subtract and other floating point operations can still result in the loss of significant bits, such as through cancelation. When this loss is significant in the current computation, this loss is recorded in the bound on the number of lost significant bits, which is termed the "result bound lost bits D" 54F (FIG. 8) stored in the lost bits field, the D Field 54.

When the outcome of a calculation results in insufficient significant bits, the bounded floating point value, the "calculated result" 260, is replaced with a special representation for an invalid bounded floating point value that is not a number (NaN), but is an inventive signaling NaN that signals insufficient significant bits, termed the "sNaN(isb)" 262 (FIG. 2B), which indicates excessive loss of significant bits. Memory in the hardware is provided for comparison to the recorded accumulated error to determine whether sufficient significant bits remain or whether sNaN(isb) 262 should be generated. As with other NaNs, the sNaN(isb) 262 is propagated into future computations. The sNaN(isb) 262 can be signaling to generate a hardware floating point exception.

The circuitry for determining loss of significant bits may contain an optionally programmable bound limit memory 802 to allow user determination of the number of significant bits required by the user resulting from a floating point calculation. The bound limit memory 802 contains a default value for each precision floating point width and can be programmable by the user.

When the inventive bounded floating point format 100 is implemented, it can be used concurrently with implementations of the current floating point standard. Therefore, existing software that is dependent upon the current floating point standard need not be discarded.

The new bound B Field 52 is inserted in the conventional floating point standard to provide accumulated information on the bound of error that delimits the real number represented.

FIG. 1 provides a virtual bitwise layout of the bounded floating point format 100 for word width of width k 101 showing the inventive bound B Field 52 (having a width b 103), which is composed of two parts, the lost bits D Field 54 (having a width d 105) and the N Field 55 (having a width n 106), as well as the standard floating point format fields. The N Field 55 is further composed of two fields, the C Field 56 (having a width c 107) and the R Field 57 (having a width r 108). The standard fields include the sign bit field, which is the S Field 50, the exponent E Field 51 (having a width e 102), and the significand field, which is the T Field 53 (having a width t 104).

Figure 8:
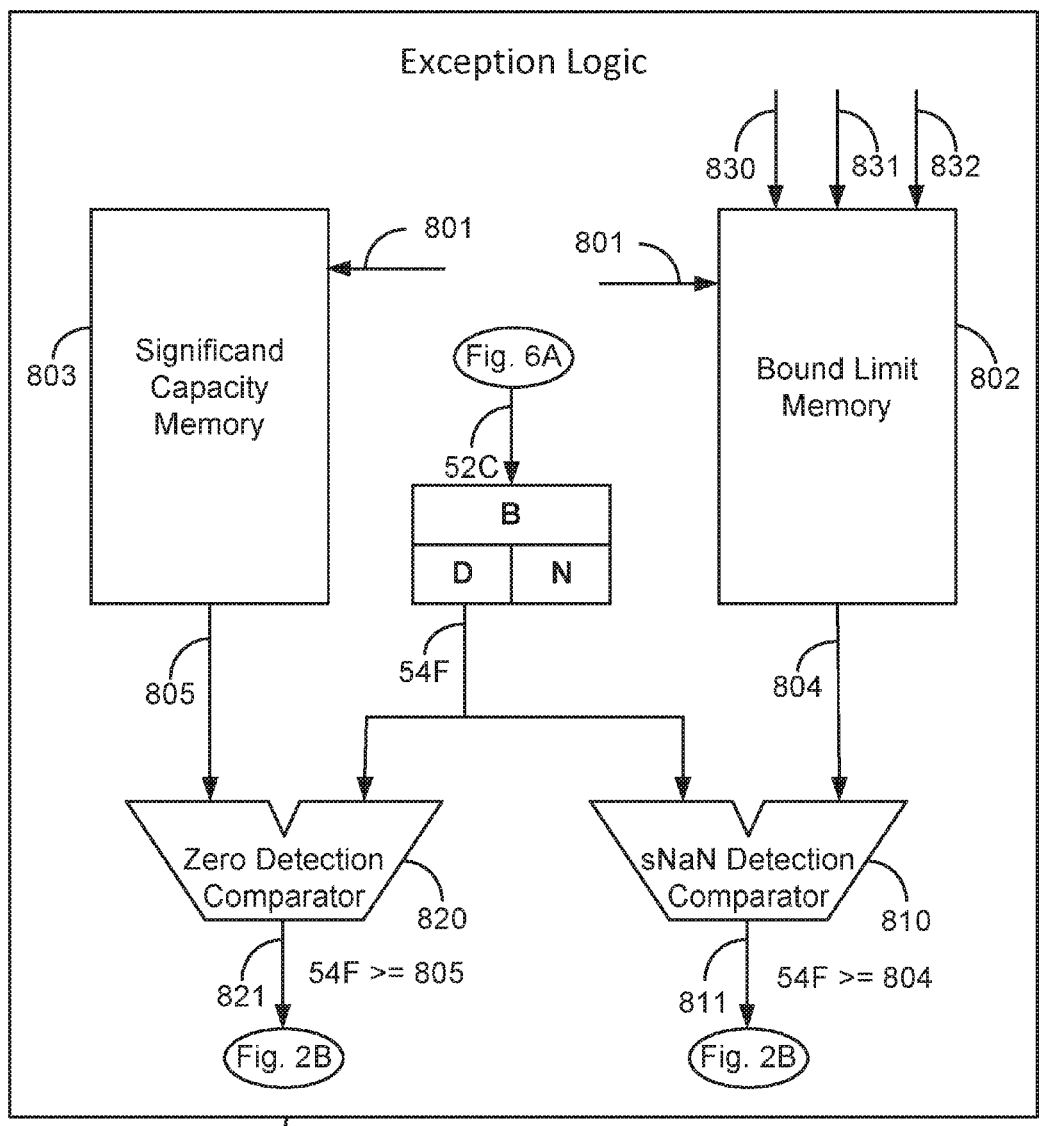
FIG. 8 is a diagram of the inventive exception logic and control that determines if the error boundary has been exceeded, which generates the inventive sNaN(isb) and also determines if the result is significantly zero.

This bound B Field 52 is a new field inserted within the floating point standard format to provide accumulated information on the bound of the represented real number. The bound B Field 52 accounts for both rounding and cancellation errors. This bound B Field 52 keeps track of the loss of significant bits resulting from all previous operations and the current operation. Recording this loss of significant bits then allows a determination to be made as to whether insufficient significant bits have been retained. When a sufficient loss of significant bits occurs, this is signaled to the main processing unit 910 by the sNaN selection control 811 (FIG. 8). When insufficient significant bits have been retained, the BFPU selects the sNaN(isb) 262 for the bounded floating point result 280 (selected from among a calculated result 260 value, a representation of sNaN(isb) 262, and a bounded floating point representation of BFP zero 261).

The lost bits D Field 54 (FIG. 1) contains the representation of the number of bits in the floating point representation that are no longer significant.

The N Field 55 is the accumulation of the rounding errors that occur from alignment and normalization.

The C Field 56 contains the representation of the sum of the carries out of the R Field 57R (FIG. 5), which like the R Field 57 has a width r 108, where the "R" designates the result after normalization. The logical OR of the bits of the extended rounding error X Field 60R, of width x 502, which is used instead of the conventional carry and guard bits. When the value of the C Field 56 exceeds the value of the lost bits D Field 54, one is added to the value of the lost bits D Field 54 and the C Field 56 is set to one (FIG. 6).

The R Field 57 contains the sum of the current R 57 and the resulting rounding bits R 57R (FIG. 5), which is the most significant r 108 bits lost due to truncation of the normalized result 720. The apparatus and method for calculating and retaining a bound on error during floating point operations is shown in the exemplary bounded floating point addition/subtraction diagram 200 shown on FIG. 2A and continuing onto FIG. 2B. This diagram provides the logic and control for an exemplary floating point addition or subtraction operation showing the inventive bounding of the floating point error (normally caused by alignment and normalization) of the present invention.

Figure 9:
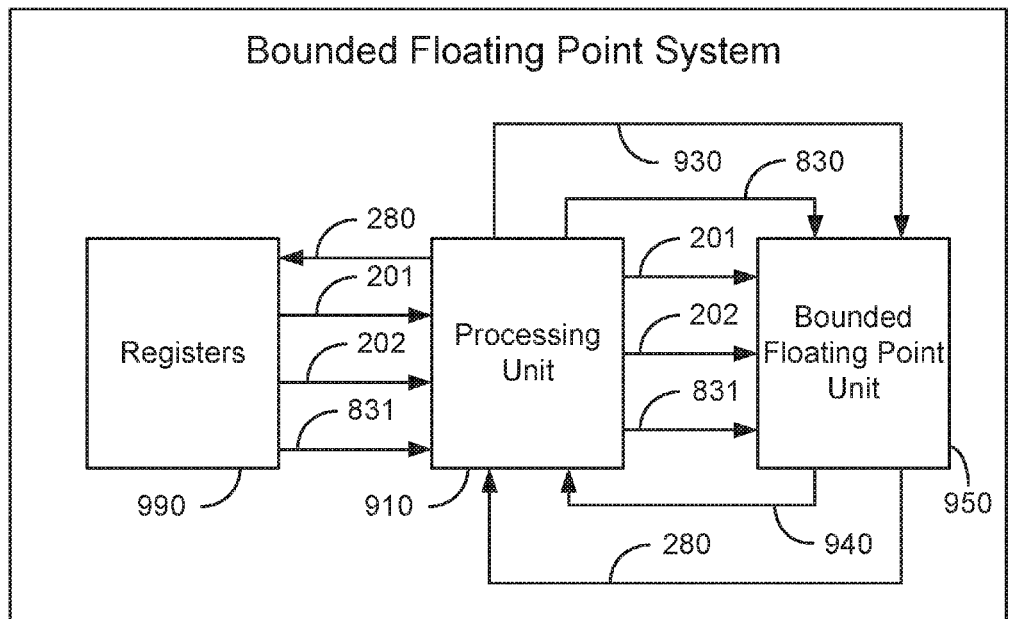
FIG. 9 is a diagram of the bounded floating point system 900.

The bounded floating point system includes a processing device with a plurality of registers 990 (FIG. 9), a main processing unit 910, and a bounded floating point unit (BFPU) 950 that is communicably coupled to the main processing unit 910. The main processing unit 910 executes internal instructions and outputs at least two types of BFPU instructions 930, 830 to the BFPU 950. The first type is a bounded floating point operation instruction 930, which instructs the BFPU 950 on the type of arithmetic operation to be performed and provides the two input operands 201, 202. The second type is a bound limit instruction 830, which is an instruction to set a default bound limit 833 or to set a programmed bound limit 831.

The arithmetic operation is performed on two input operands 201, 202, which in the example of FIGS. 2A, 2B, are stored in the first operand register 210 and the second operand register 220, respectively. Then the BFPU 950 generates a result value, the bounded floating point result 280, from executing the FPU instructions on the bounded floating point number inputs 201, 202. This bounded floating point result 280 includes an error bound value obtained from the accumulated cancellation error and the accumulated rounding error. When there are insufficient significant bits in the bounded floating point result 280, the BFPU 950 generates an sNaN selection control 811 signaling insufficient significant bits. The BFPU 950 also writes the bounded floating point result 280 to a main processing unit 910 solution register of the plurality of registers 990, thereby storing the results from the operation of the bounded floating point unit 950.

The first operand register operand 210 of FIG. 2A is the register (where a register may be a hardware register, a location in a register file, or a memory location) that contains the first operand 201 in the bounded floating point format 100.

The first operand 201 of FIG. 2A is the bounded floating point first addend for an addition operation or is the minuend for a subtraction operation. The first operand 201 includes a first operand S value 50A, a first operand exponent E value 51A, a first operand bound B value 52A, and the first operand significand T value 53A.

The first operand register operand 220 of FIG. 2A is the register (where a register may be a hardware register, a location in a register file, or a memory location) that contains the first operand 202 in the bounded floating point format 100.

The second operand 202 is the bounded floating point second addend for an addition operation or is the subtrahend for a subtraction operation. The second operand 202 includes a second operand sign bit S 50B, a second operand exponent E 51B, a second operand bound B 52B, and the second operand significand T 53B.

Many steps within this bounded floating point addition/subtraction diagram 200 of FIGS. 2A-2B are conventional steps (which are generally denoted by dashed lines), but some results from these conventional steps are utilized in the inventive apparatus and method.

Figure 3:
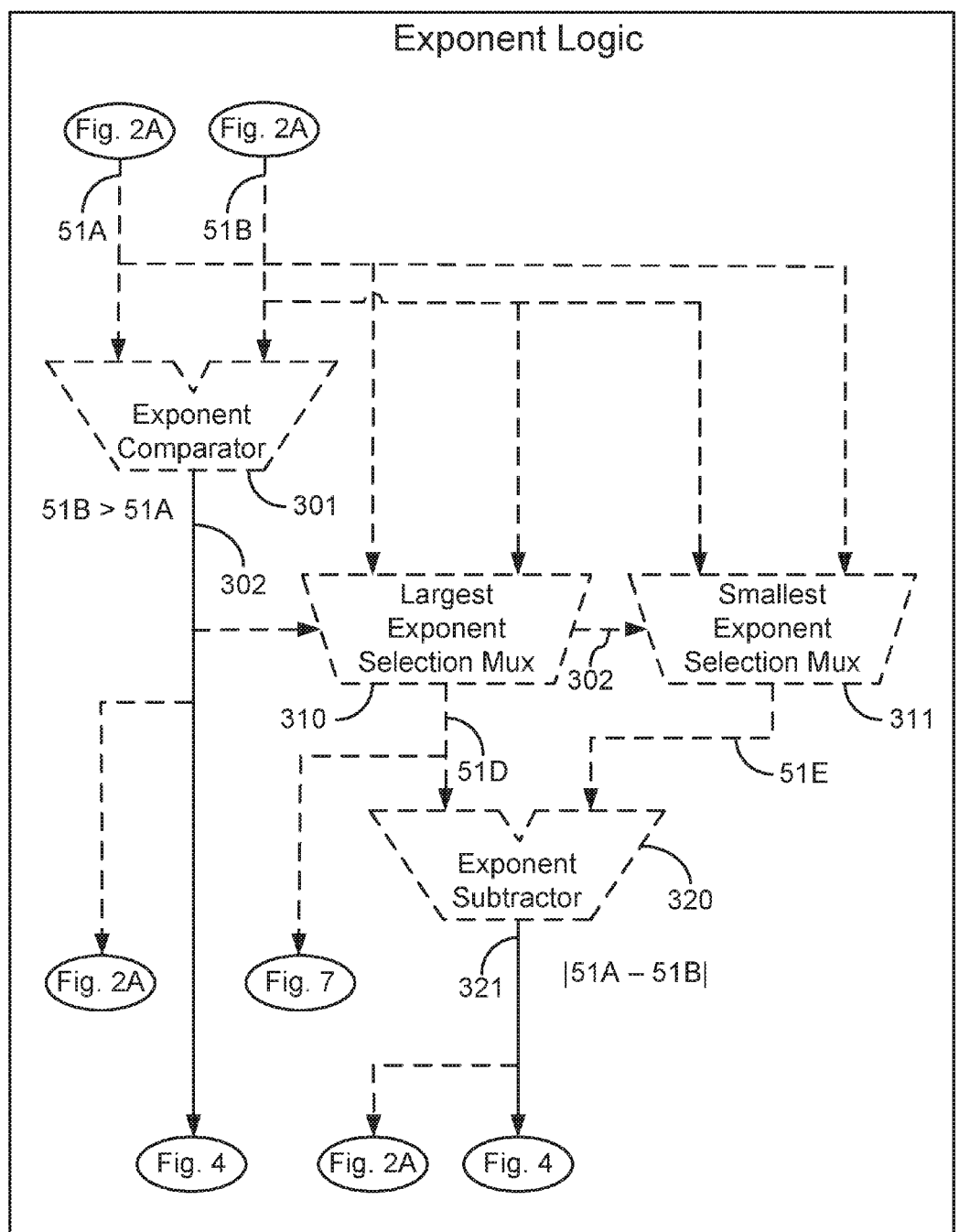
FIG. 3 is a diagram of the calculation of the exponent that provides information utilized in the inventive bound logic of FIGS. 2A, 4, and 7.
Figure 4:
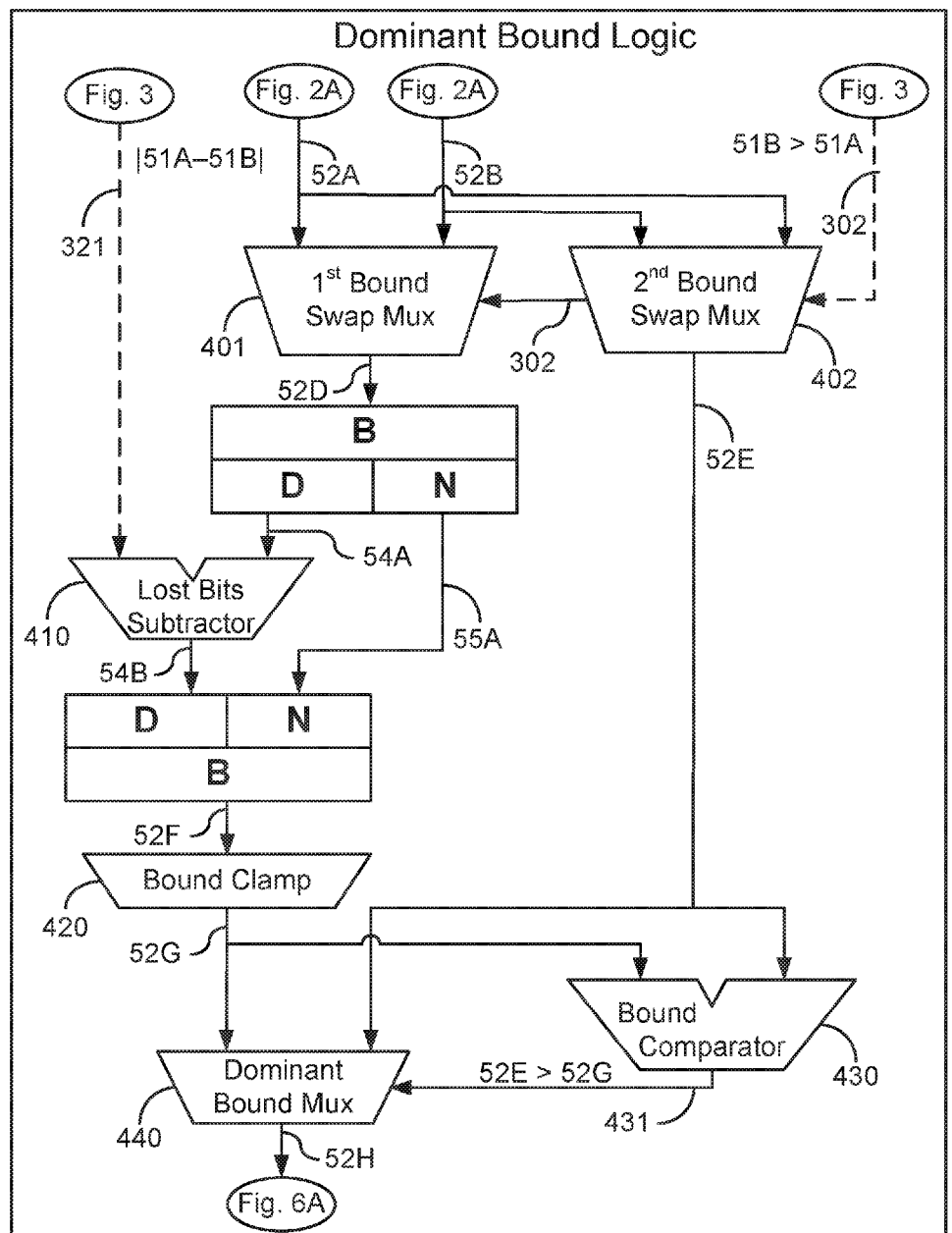
FIG. 4 is a diagram of the inventive dominant bound logic and control of the error bounding of the present invention.

Turning to the exponent logic steps 300 of FIGS. 2A, 3, the first operand exponent E 51A (coming from the first operand 201 of FIG. 2A) and the second operand exponent E 51B (coming from the second operand 202 of FIG. 2A) are compared in the exponent comparator 301 to determine the largest exponent control 302. The largest exponent control 302 is the control signal that controls the first and second significand swap multiplexers 230, 231 (FIG. 2A), controls the largest and smallest exponent selection multiplexers 310, 311, and controls the first and second bound swap multiplexers 401, 402 (FIG. 4).

Additionally, as seen on FIG. 3, the largest exponent control 302 is the control signal identifying the larger of the first operand exponent E 51A or the second operand exponent E 51B and controls the largest exponent selection multiplexer 310. The largest exponent selection multiplexer 310 selects the largest exponent E 51D from the first operand exponent E 51A and the second operand exponent E 51B controlled by the largest exponent control 302. The smallest exponent selection multiplexer 311 is also controlled by the largest exponent control 302 and selects the smallest exponent E 51E from the first operand exponent E 51A and the second operand exponent E 51B. The exponent difference 321 is calculated by the exponent subtractor 320 that subtracts the smallest exponent E 51E from the largest exponent E 51D. The exponent difference 321 controls the alignment shifter 240 (FIG. 2A) and is used by the lost bits subtractor 410 (FIG. 4).

Additionally, as seen on FIG. 2A, the largest exponent control 302 provides control for the first and second significand swap multiplexers 230, 231 (FIG. 2A). The first significand swap multiplexer 230 selects from either the first operand significand T 53A or the second operand significand T 53B and produces the significand T of the operand with the smallest exponent E 53D. Similarly, the second significand swap multiplexer 231 selects the significand T of the operand with the largest exponent E 53E from either the first or second operand significands T 53A, 53B.

The alignment shifter 240 (FIG. 2A) shifts the significand T of the operand with the smallest exponent E 53D to the right by the number of bits determined by the exponent difference 321 (coming from the exponent logic 300, FIG. 3) to produce the aligned significand T of the operand with the smallest exponent E 241. Only one bits (not zero bits) shifted out of the alignment shifter 240 causing alignment shift loss 242 are inserted into the least significant bit of the aligned significand T of the operand with the smallest exponent E 241 ensuring that a significand excess 741 will be detected.

The significand adder 250 (FIG. 2A) calculates the sum or difference 251 of the aligned significand T of the operand with the smallest exponent E 241 and the significand T of the operand with the largest exponent E 53E. The virtual width v 501 (FIG. 5) of the significand adder is the width of the resulting sum or difference taking into account possible need for multiple additions necessary to accommodate extended bounded floating point formats.

Figure 5:
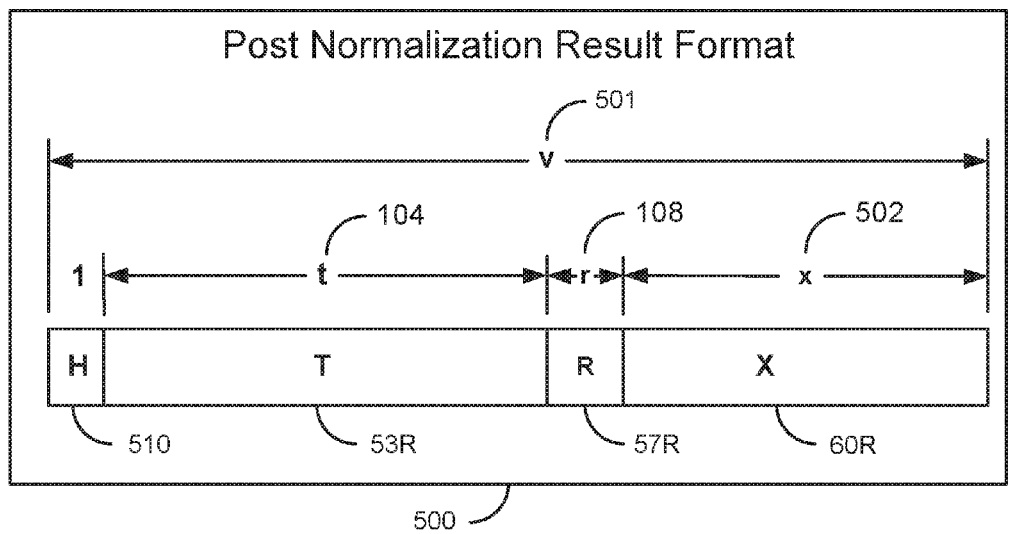
FIG. 5 is a diagram of the format of the post normalization result derived from FIG. 7 that will contribute to the determination of the inventive bound B Field.

FIG. 5 provides a detail of the format 500 of the post normalization result, which is the format of the bounded floating point significand adder result 720 after normalization. This format includes: (1.) the standard hidden bit H Field 510, the left justified hidden bit H Field 510 after normalization; (2.) the resulting normalized significand T 53R (t 104 bits in width), the resulting significand after normalization; (3.) the resulting rounding bits R Field 57R of width r 108 holding the most significant bits of the resulting significand that are lost due to truncation; and (4.) the extended rounding error X Field 60R of width x 502 containing the bits of the result lost due to truncation, which is to the right of the R Field 57R in the format.

Figure 7:
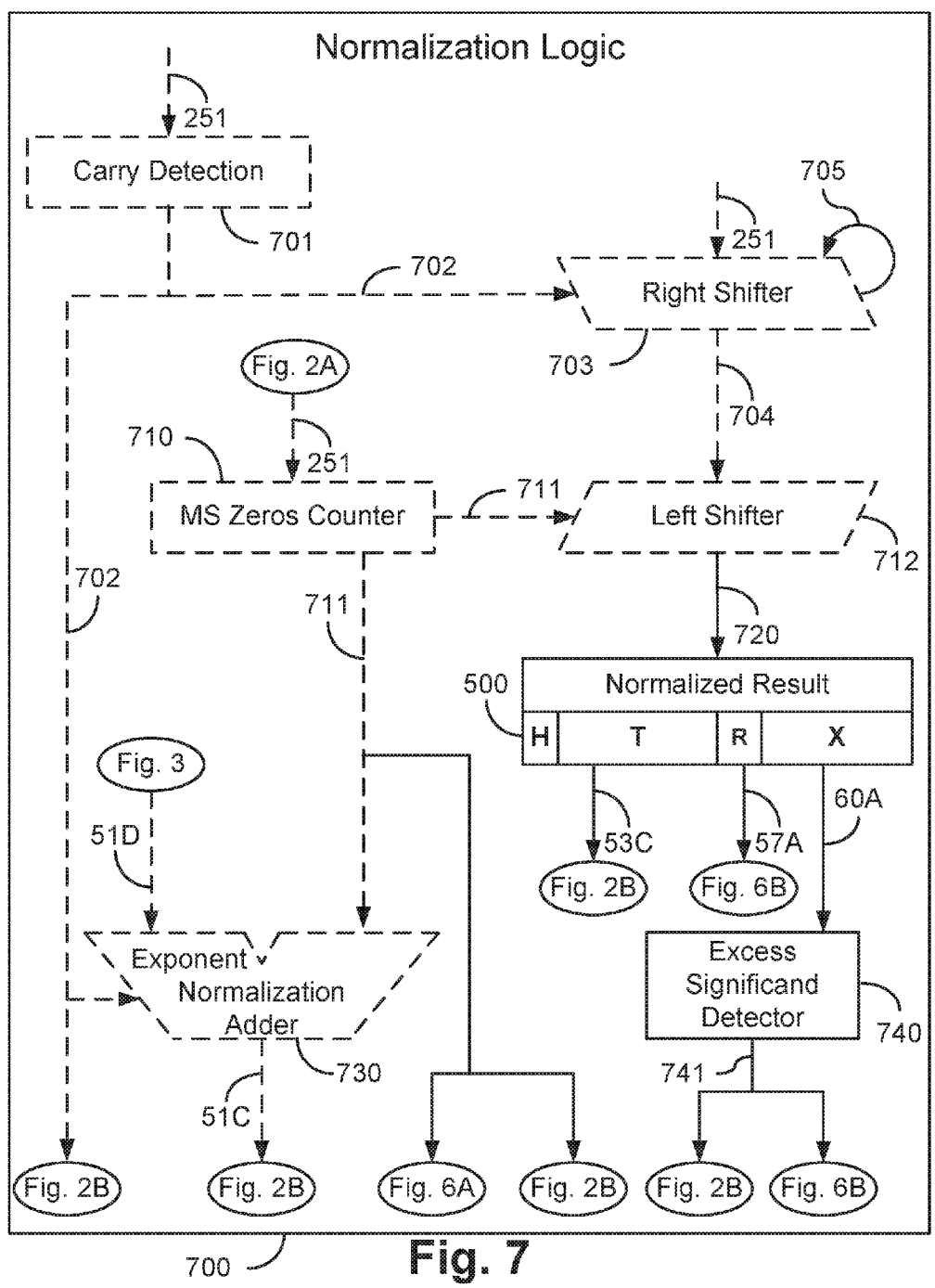
FIG. 7 is a diagram of the normalization logic and control that produces a normalized result that will contribute to the determination of the inventive bound B Field and is used in FIGS. 2B, 6A, and 6B.

The calculated sum or difference 251 (FIG. 2A) is utilized in the normalization logic 700 of FIG. 2B, which is expanded on FIG. 7. Turning to the details of the normalization logic 700 of FIG. 7, the sum or difference 251 is used by the right shifter 703 or left shifter 712 to arrive at the normalized result 720. The first control for this determination is the right shift control 702 controlling the right shifter 703, which is determined by the carry detection 701. The right shifter 703, when indicated by the right shift control 702, shifts the sum or difference 251 right one bit producing the right shift result 704. The right shift loss 705 is a one bit shifted out of the right shift result 704. When this occurs, a one bit is inserted into the least significant bit of the right shift result 704 ensuring that a significand excess 741 will be detected. This right shift result 704 is utilized in the left shifter 712. When the right shift control 702 is not asserted, the right shift result 704 is equal to the sum or difference 251.

Also in FIG. 7, the sum or difference 251 is used in the most significant zeros counter 710, which is another control. The zeros counter 710 counts the most significant zeros of the sum or difference 251, which produces the number of leading zeros 711 necessary to normalize the result. The number of leading zeros 711 controls the left shifter 712 by shifting the right shift result 704 left producing the normalized result 720 comprised of the truncated resulting significand T 53C, the normalized rounding R 57A, and the normalized extension X 60A. If the most significant zeros counter 710 determines that there are no leading zeros, the normalized result 720 is equal to the right shift result 704. If there is no right or left shift, the value is merely passed through (which occurs if there is no carry and if there are no significant zeros). The number of leading zeros 711 is also used in the exponent normalization adder 730 and is further used in the inventive main bound logic 600 of FIG. 2B, which is expanded on FIG. 6.

Still on FIG. 7, the largest exponent E 51D (from FIG. 3) is adjusted for normalization by the exponent normalization adder 730 using the right shift control 702 and the number of leading zeros 711.

The normalized extension X 60A is derived from the X Field 60R of the post normalization result format 500 (FIG. 5) of the normalized result 720.

The excess significand detector 740 produces the logical OR of all bits of the normalized extension X 60A producing the significand excess 741. The significand excess 741 is utilized by the count adder 640 (FIG. 6B) of the inventive main bound logic 600 (FIGS. 2B, 6A-6B).

The exponent normalization adder 730 (FIG. 7) adds the right shift control 702, or subtracts the number of leading zeros 711, to or from the largest exponent E 51D to produce the result exponent E 51C, which is the exponent in the inventive calculated result 260 of FIG. 2B.

The sign logic 290 of FIG. 2B operates in the conventional manner, determining the result sign bit S 50C from the operand sign bit S 50A, the second operand sign bit S 50B, and the right shift control 702.

Figure 6A:
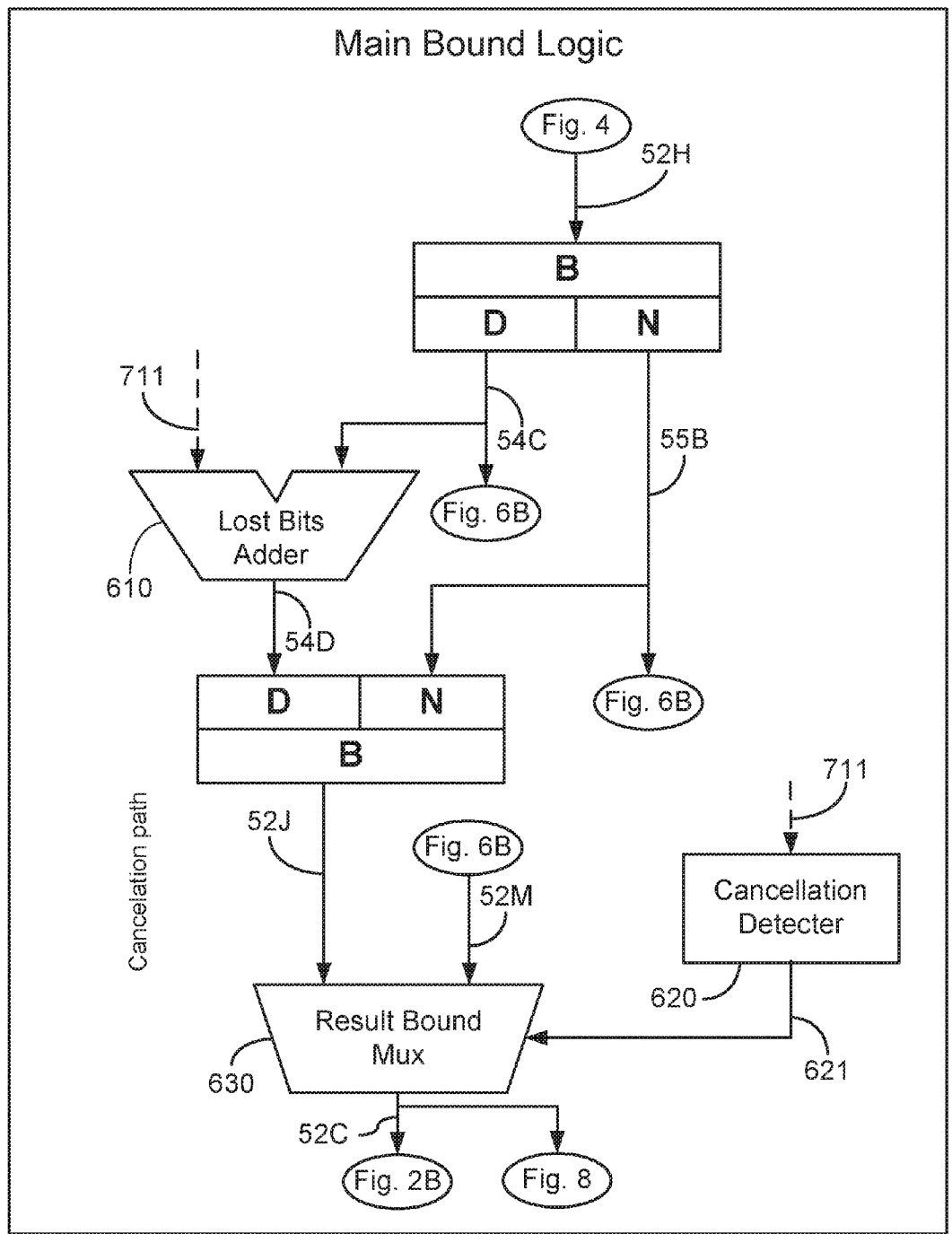
FIGS. 6A-6B is a diagram of the inventive main bound computation logic and control of the present invention that provides information used in FIG. 2B and FIG. 8.
Figure 6B:
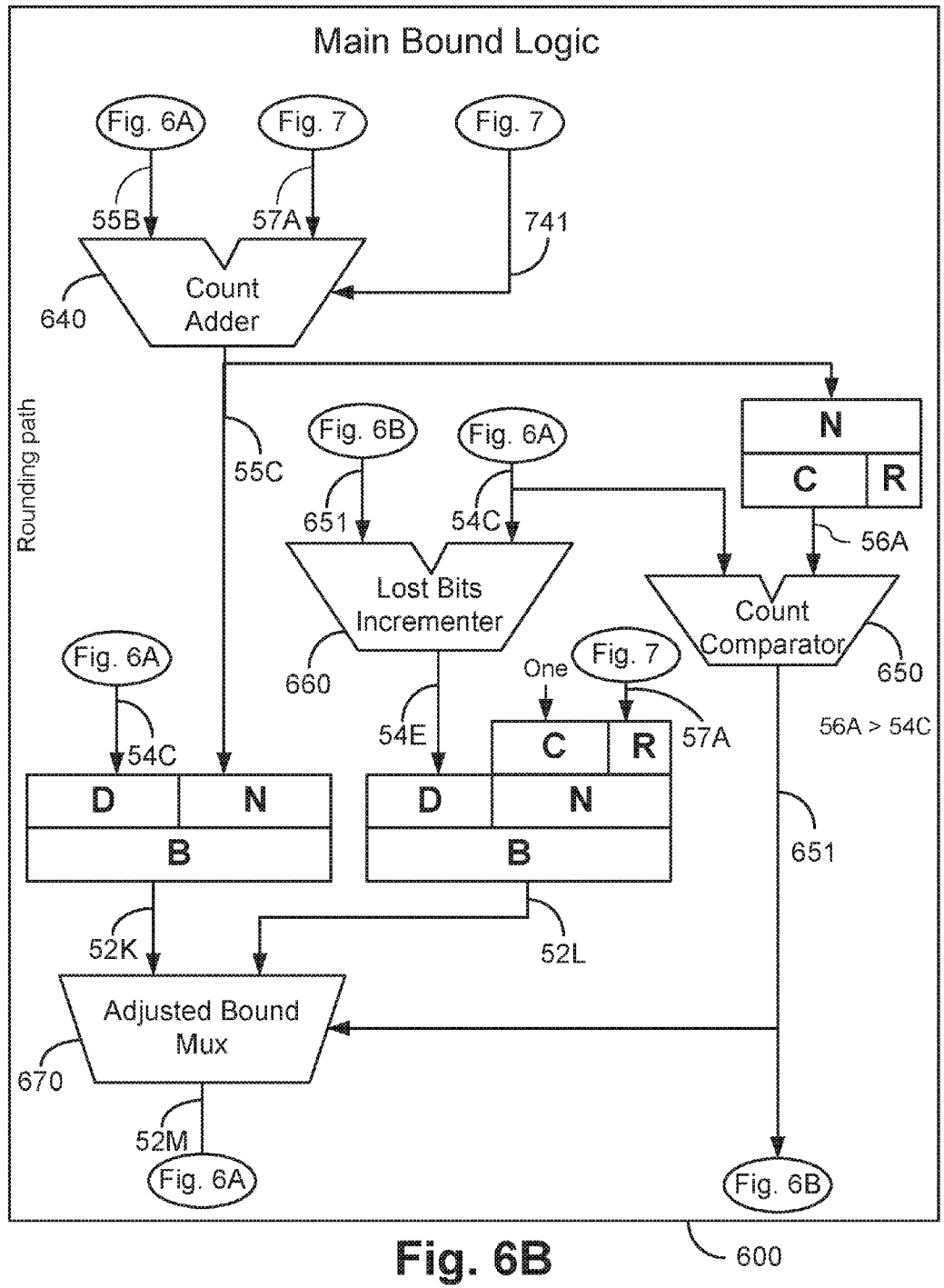

Turning to the exemplary diagram 200 of the logic and control of the inventive apparatus and method of FIG. 2B, the calculated result 260 is created from the concatenation of the result sign bit S 50C, the result exponent E 51C of FIG. 7, the result bound B 52C of FIG. 6A, and the truncated resulting significand T 53C of FIG. 7.

Turning to the exemplary diagram 200 of the logic and control of the inventive apparatus and method of FIG. 2A, the first operand bound B 52A of FIG. 2A, the second operand bound B 52B of FIG. 2A, the largest exponent control 302 of FIG. 3, and the exponent difference 321 of FIG. 3 are used in the dominant bound logic 400 of FIG. 2A, which is expanded in FIG. 4.

In an arithmetic operation, the operand with the least number of significant digits determines ("dominates") the number of significant digits of the result. When, after being aligned, the number of significant bits in one operand is less than the significant bits in the other operand, the significant bits of the operand with fewer significant bits governs or dominates the base significant bits of the result. The dominant bound logic 400 selects the bound from the initial operands, first operand bound B 52A and the second operand bound B 52B, to determine the bound with the most influence on the bound of the result prior to accounting for cancellation and rounding.

As seen in the dominant bound logic 400 of FIG. 4, the bounds of both operands (first and second operand bounds B 52A, 52B of FIG. 2A) are compared—with one bound adjusted before comparison. The dominant bound logic 400 determines the dominant bound B 52H. The dominant bound B 52H is the larger of (1.) the clamped bound B 52G and (2.) the bound of the operand with the largest exponent (largest exponent operand bound B 52E). This dominant bound B 52H is the best-case bound of the operand when there is no rounding or cancellation. In an arithmetic operation, the adjusted operand with the least number of significant bits dominates this determination of the bound of the result, because the dominant bound B 52H (from the bounds B 52G or 52E, where clamped bound B 52G is derived from the adjusted bound of the operand with the smallest exponent B 52F) with the largest number of lost bits is this best-case bound.

Turning to the details of FIG. 4, the first bound swap multiplexer 401, controlled by the largest exponent control 302 (from FIG. 3), selects from either the first operand bound B 52A or the second operand bound B 52B (both from FIG. 2A), resulting in the smallest exponent operand bound B 52D. The second bound swap multiplexer 402, which is also controlled by the largest exponent control 302, selects from either the second operand bound B 52B or the first operand bound B 52A, which results in the largest exponent operand bound B 52E.

The lost bits subtractor 410 is a circuit that subtracts the exponent difference 321 (FIG. 3) from the smallest exponent operand bound lost bits D 54A, the lost bits portion of the smallest exponent operand bound B 52D, producing the adjusted smallest exponent operand bound lost bits D 54B. The adjusted smallest exponent operand bound lost bits D 54B is concatenated with the smallest exponent operand bound accumulated rounding error N 55A to form the adjusted bound of the operand with smallest exponent B 52F. The subtraction may produce a negative adjusted smallest exponent operand bound lost bits D 54B indicating that there are no significant digits lost during alignment at the alignment shifter 240 (FIG. 2A); this case is dealt with via the bound clamp 420. The bound clamp 420 prohibits the adjusted bound of the operand with the smallest exponent B 52F from underflowing to less than zero. This limits the clamped bound B 52G to zero or greater. Zero indicates that all the bits of this adjusted operand are significant.

The bound comparator 430 compares the largest exponent operand bound B 52E to the clamped bound B 52G to determine the dominant bound control 431. This dominant bound control 431 is asserted when the largest exponent operand bound B 52E is greater than the clamped bound B 52G. The dominant bound control 431 is used by the dominant bound multiplexer 440 that selects the dominant bound B 52H from either the largest exponent operand bound B 52E or the clamped bound B 52G and is utilized in the main bound logic 600 of FIG. 6A.

Turning now to FIG. 6A, the main bound logic 600 determines the result bound B 52C of the calculated result 260 (FIG. 2B) of the current operation. The inputs for this are (1.) the dominant bound B 52H of FIG. 4, (2.) the number of leading zeros 711 (the number of most significant zeros, from FIG. 7), and (3.) the carry adjusted bound B 52M of FIG. 6B. The result bound B 52C is utilized by the calculated result 260 of FIG. 2B and the determination of the result bound lost bits D 54F of FIG. 8.

In this cancellation path, when shifting right, significant bits are lost. These lost significant bits must be added to the dominant bound lost bits D 54C. The dominant bound lost bits D 54C is the lost bits 54 of the dominant bound B 52H. This dominant bound lost bits D 54C is used in the lost bits adder 610, which adds the number of leading zeros 711 (from FIG. 7) to the dominant bound lost bits D 54C, resulting in the adjusted lost bits D 54D. The adjusted lost bits D 54D is concatenated with the dominant bound accumulated rounding error N 55B to create the cancellation adjusted bound B 52J. The dominant bound accumulated rounding error N 55B is the accumulated rounding error of the dominant bound B 52H.

Turning to FIG. 6B, the count adder 640 adds the accumulated rounding error N 55B, the normalized rounding R 57A (FIG. 7), and significand excess 741 (FIG. 7) producing the updated accumulated rounding error N 55C.

The count comparator 650 asserts the count overflow 651 when the updated accumulated rounding error extension count C 56A is greater than the dominant bound lost bits D 54C of FIG. 6A. The updated accumulated rounding error extension count C 56A is the extension count 56 portion of the updated accumulated rounding error N 55C. The dominant bound lost bits D 54C and the count overflow 651 are utilized by the lost bits incrementer 660 and the adjusted bound multiplexer 670.

The lost bits incrementer 660 adds one to the dominant bound lost bits D 54C when the count overflow 651 is asserted producing the incremented lost bits D 54E. The lost bits adjusted bound B 52L is the bound comprised of the concatenation of the incremented lost bits D 54E, an extension count having a value of one in the C Field 56, and normalized rounding R 57A.

The count adjusted bound B 52K is the concatenation of the dominant bound lost bits D 54C with the updated accumulated rounding error N 55C.

The adjusted bound multiplexer 670 selects either the lost bits adjusted bound B 52L when the count overflow 651 is asserted, or selects the count adjusted bound B 52K to produce the carry adjusted bound B 52M utilized by the count comparator 650 of FIG. 6B.

The cancellation detector 620 (FIG. 6A) asserts cancellation control 621 when there is cancellation by determining that the number of leading zeros 711 is greater than one. This condition would be false, for instance, during an add operation with like signs. This condition is true when cancelation has occurred during a subtract or other operation in which cancellation may occur.

The result bound multiplexer 630 (FIG. 6A) selects either the cancellation adjusted bound B 52J or the carry adjusted bound B 52M of FIG. 6B depending on the cancellation control 621. The result is the result bound B 52C to be included in the final result of the current operation (the calculated result 260 of FIG. 2B).

Referring now to the exception logic 800 of FIG. 8, the exception logic 800 provides controls (821 and 811) for the exceptions requiring specialized representation, zero and NaN. Considering the specialized representation of zero, the result of a subtract instruction yields a representation of zero when the significant bits of the result are zero. This is determined by comparing the resulting lost bits to the number of bits available in the operands of the current operation. Considering the specialized representation of the sNaN(isb) 262 (of FIG. 2B)], if it is determined that the results lost bits D 54F is greater than the unacceptable limit 804, then the bounded floating point result 280, FIG. 2B, is the specialized representation "sNaN(isb)."

Turning to the details of FIG. 8, the significand capacity memory 803 is a static memory that provides the size of the T Field 53 plus one for the hidden bit H Field 510 (t+1, where width t 104 is the width of the significand T, as seen on FIG. 1) for the width of the current operation. Memory is addressed by the operation width control 801. The operation width control 801 is a signal provided by the processor indicating the width of the current bounded floating point operation in the form of an address. The significand capacity memory 803 produces the significand capacity 805, which is the total number of bits of the significand of the result (including the hidden bit H 510).

The results lost bits D 54F is the lost bits of the result bound B 52C (FIGS. 2B, 6A). The zero detection comparator 820 asserts the zero selection control 821 (FIG. 2B) when the results lost bits D 54F is greater than or equal to the significand capacity 805.

The bound limit memory 802 is a memory (static or optionally dynamic) containing the unacceptable limit 804 on the result lost bits D 54F for the current operation format width. This bound limit memory 802, also addressed by the operation width control 801, provides the unacceptable bound limit 804.

The sNaN detection comparator 810 asserts the sNaN selection control 811 when the result lost bits D 54F is greater than or equal to the unacceptable bound limit 804. The sNaN selection control 811 is the signal provided to the exception and result multiplexer 270 (FIG. 2B) to select the sNaN(isb) 262 as the bounded floating point result 280 (FIG. 2B).

In the inventive apparatus and method, initially the bound limit memory 802 contains the default bound limit 833 values, which can be static (default) or dynamic (programmed bound limit 831).

In the optional dynamic case shown on the right in FIG. 8, the bound limit can be changed from the default bound limit 833 value(s). The programmed bound limit 831 is a value provided by an optional bounded floating point instruction. This bounded floating point instruction stores an unacceptable bound limit 804 value in the bound limit memory 802 in a location determined by the operation width control 801 and occurs when the memory receives the limit write instruction 830. The optional bounded floating point limit write instruction 830 provides an elective write control. This instruction stores a programmed bound limit 831 into the bound limit memory 802 into an address determined by the operation width control 801.

The bound limit memory default reset control 832 is an elective control signal from an optional special bounded floating point instruction that resets all bound limit memory 802 locations to a default bound limit 833 specific for each of the bound limit memory 802 locations, which may be based on the precision. Optionally, the bound limit memory default reset control 832 can designate a particular bound limit memory 802 location that is to be reset to a default bound limit 833, which is determined by the operation width control 801.

In a first example, for single precision (32-bit, width k 101=32) bounded floating point operation, if the T Field 53 is 16 bits in width (t 104=16) providing 17 significant bits including the hidden bit H 510 (5 significant decimal digits), then the width of the lost bits D Field 54 (d 105) and C Field 56 (c 107), would need to be 3 bits each. This accommodates the standard 8-bit exponent, E Field 51 (width e 102) and allows 1 bit for the R Field 57 making the N Field 55 4 bits (n 106=4). If the desired default significance is 3 decimal digits, then 10 binary bits including the hidden bit H 510 are required. This would mean that the allowable number of results lost bits D Field 54F (width d 105) could not exceed 7, the required value of the acceptable bound limit 804 for the bound limit memory 802 selected by the operation width control 801 for a single precision bounded floating point operation.

As an additional example, for a double precision (64-bit, width k 101=64) bounded floating point operation, if the T Field 53 is 36 bits in width (width t 104=36), providing 37 significant bits (11+ significant decimal digits) including the hidden bit H 510, as specified in the significand capacity memory 803 location corresponding to a double precision operation, then the width of the lost bits D Field 54 (d 105) and the C Field 54 (c 107) would need to be 6 bits each allowing 4 bits for the R Field 57 (width r 108=4) thereby making the N Field 55 10 bits (width n 106=10). If the desired default decimal significance is 6 decimal digits, then 20 binary bits, including the hidden bit H 510, are required. This would mean that the allowable number of results lost bits D 54F could not exceed 17, the required value of the acceptable bound limit 804 for the bound limit memory 802 selected by the operation width control 801 for a double precision bounded floating point operation.

Turning back to FIG. 2B, the exception and result multiplexer 270 selects the bounded floating point result 280 from either the calculated result 260, BFP zero 261, or sNaN(isb) 262 based on the zero selection control 821 or the sNaN selection control 811. The zero selection control 821 takes precedence over the sNaN selection control 811. If neither the zero selection control 821 nor the sNaN selection control 811 is asserted, then the bounded floating point result 280 is the calculated floating point result 260.

Where O is the exponent offset, t is the width of the significand, T is the value of the significand, S is the sign 0 or 1, E is the exponent, D is the lost bits, and $2^t$ is the hidden bit H 510:

the real value represented by a non-zero, non-NaN, and normalized bounded floating point value lies between the following:

$$-1^S \times ((T+2^t)/2^{t-1})^{E-O} \text{ and } -1^S \times ((T+2^t+2^D)/2^{t-1})^{E-O}$$

and for denormalized values (where the value of the E Field is zero and there are no hidden bits), the first and second bounds are the following:

$$-1^S \times T/2^{t-1} \text{ and } -1^S \times (T+2^D)/2^{t-1}$$

and the expected value is the average of the first and second bounds.

Error that is introduced into floating point values when converted from an external decimal representation can be recorded in this inventive floating point representation. Conversion to external representation of a real number in decimal can be confined to only significant bits or can be expressed as a bounded real number of the form v+/−e where v is the expected real value expressed as a real number (in the format $x \times 10^p$), where x is a decimal value and p is an integer power of 10) and e is the first and second bound of the error expressed as a similarly formatted real number.

In the present inventive apparatus and methods when two values are compared by subtraction in which cancellation occurs two considerations are made, as follows.

In considering equality, when the two operands are equal in their significant bits, the result will truly be zero. As noted above, when the number of lost bits exceeds the number of bits available for the significand (or exceeds the significand capacity 805), the result of the equality comparison operation is set to the representation for zero. However, when the result is significantly zero in a subtraction operation, and that result is used in additional mathematical operations, it may be desirable to retain the bound field for that zero. This may require separate bounded floating point operations for comparison and subtraction.

In considering non-equality, in which there are typically four instances, which are greater-than, less-than, greater-than-or-equal-to, and less-than-or-equal-to, there are only two instances that need to be considered, because equal-to is handled as noted above. In considering greater-than, if the maximum value of the first operand is greater than the maximum value of the second operand, then the first operand is greater than the second operand. Similarly, if the minimum value of the second operand is less than the minimum value of the first operand, then the first operand is greater than the second operand.

In some instances, the sign of the result of the operation does not necessarily reflect the greater-than or less-than condition. This occurs when the minimum value of the first operand is less than the maximum value of the second operand and the maximum value of the second operand is greater than the minimum value of the first operand. In this instance, conventional methods may be relied upon to determine the result. These instances may also require special bounded floating point instructions.

In the present inventive apparatus and method, conversion of one bounded floating point width to a larger bounded floating point width (e.g., 32-bit to 64-bit, etc.) requires conversion of the loss of significant bits D Field 54 from the narrow width to the wider width. This requires that the number of retained significant bits be calculated for the first width and then converted to loss of significant bits for the second width. This may result in the generation of the sNaN(isb) 262 when converting, for instance, from 32-bit to 64-bit bounded floating point representations, when the newly computed loss of significant bits exceeds the limit value (unacceptable bound limit 804) for the new width. Similarly, when converting from wider to narrower bounded floating point widths, all of the bits may be significant but bits lost from the X Field 60R (FIG. 5) obtained from the wider representation must be accumulated as the initial loss of significant bits.

The exemplary embodiment depicted herein, describes a bounded floating point circuit with real-time error bound tracking within or in association with a processor, computer system, or other processing apparatus. In this description, numerous specific details such as processing logic, processor types, micro-architectural conditions, events, enablement mechanisms, and the like are set forth in order to provide a more thorough understanding of embodiments of the present invention. It will be appreciated, however, by one skilled in the art, that the invention may be practiced without such specific details. Additionally, some well-known structures, circuits, and the like have not been shown in detail to avoid unnecessarily obscuring embodiments of the present invention.

One embodiment of the present invention may provide a single core or multi-core bounded floating point processor or may be included in other floating point or general purpose processors. The processor may comprise a register file and a permutation (multiplexer) unit coupled to the register file. The register file may have a plurality of register banks and an input to receive a selection signal. The selection signal may select one or more unit widths of a register bank as a data element boundary for read or write operations.

Although the herein described embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform specific data width operations and can be applied to any processor and machine in which manipulation or management of data is performed whether such operations are conducted with binary, decimal, or binary encoded decimal data representations.

In addition, though the embodiment presented herein represents an apparatus and associated method for bounded floating point addition and subtraction, it is presented as an example of bounded floating point operations. By extension, the same inventive apparatus for calculating and retaining a bound on error during floating point operations can be used in other floating point operations such as multiplication, division, square root, multiply-add, and other floating point functions. Other embodiments may contain ancillary bounded floating point operations such as conversion between floating point formats including, but not limited to, external representations of real numbers, standard floating point, bounded floating point, and includes formats of varying width.

Although the examples provided herein describe instruction handling and distribution in the context of execution units and logic circuits, other embodiments of the present invention can be accomplished by way of data or instructions stored on a machine-readable, tangible medium, which, when performed by a machine, cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet or other networks via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language (HDL, e.g. VHDL) or another functional description language. Additionally, a circuit level model with logic and/or transistor gates may be produced. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus, it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, with associated micro-code, which includes processor logic and circuits used to implement one or more instruction sets. Accordingly, processors with different micro-architectures can share at least a portion of a common instruction set. For example, Intel® processors, Intel® Core™ processors, and processors from Advanced Micro Devices implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file). In one embodiment, registers may include one or more registers, register architectures, register files, or other register sets that may or may not be addressable by a software programmer.

In one embodiment, a floating point format may include additional fields or formats indicating various fields (number of bits, location of bits, etc.). Some floating point formats may be further broken down into or defined by data templates (or sub formats). For example, the data templates of a given data format may be defined to have different subsets of the data format's fields and/or defined to have a given field interpreted differently.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two or more source vector operands to generate a destination vector operand (also referred to as a result vector operand) of the same or different size, with the same or different number of data elements, and in the same or different data element order.

In one embodiment, destination and source registers/data are generic terms to represent the source and destination of the corresponding data or operation. In some embodiments, they may be implemented by registers, memory, or other storage areas having other names or functions other than those depicted. For example, in one embodiment, the calculated result 260 may be a temporary storage register or other storage area, whereas the first operand 201 and the second operand 202 may be a first and second source storage register or other storage area, and so forth. In other embodiments, two or more of the operand and result storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

In one embodiment, a non-transitory machine-readable storage medium comprising all computer-readable media except for a transitory, propagating signal, may contain all or part of the invention described herein.

| GLOSSARY | | | |
|---|---|---|---|
| No. | Name | Description | |
| FIG. 1 | | | |
| | field | refers to either a portion of a data structure or the value of that portion of the data structure | |
| 100 | bounded floating point format | provides a virtual bitwise layout of the new floating point format. | |
| 50 | sign bit field (S Field) | is the standard floating point sign bit. (Information Technology - Microprocessor Systems - Floating-Point Arithmetic, International Standard, ISO/IEC/IEEE 60569: 2011. Geneva: ISO, 2011, p. 9) | |
| 51 | exponent field (E Field) | is the biased floating point exponent. (Information Technology - Microprocessor Systems - Floating-Point Arithmetic, International Standard, ISO/IEC/IEEE 60569: 2011. Geneva: ISO, 2011, p. 9) | |
| 52 | bound field (B Field) | is a new field added to the floating point standard to provide accumulated information on the bound of the represented real number. | |
| 53 | significand field (T Field) | is the floating point significand. It is the fraction of the floating point value less the hidden bit H 510 of the current art. (Information Technology - Microprocessor Systems - Floating-Point Arithmetic, International Standard, ISO/IEC/IEEE 60569: 2011. Geneva: ISO, 2011, p. 9) The width t of the bounded floating point format 100 is smaller than the corresponding standard format width to accommodate the bound B Field 52. | |
| 54 | lost bits field (D Field) | is the number of bits in the floating point representation that are no longer significant. This is a subfield of the bound B Field 52 of the bounded floating point format 100. | |
| 55 | accumulated rounding error field (N Field) | is the accumulation of the rounding errors that occur from alignment and normalization. This is a subfield of the bound B Field 52 of the bounded floating point format 100. It is composed of the C Field 56 and the R Field 57. | |
| 56 | rounding error count field (C Field) | is the sum of the carries from the sum of the R Field 57R from successive operations. This is a subfield of the N Field 55 of the bounded floating point format 100. | |
| 57 | rounding bits field (R Field) | is the sum of the rounded most significant bits of the rounding error, lost during truncation. This is a subfield of the N Field 55 of the bounded floating point format 100. | |
| 101 | bounded floating point width | is the width of a bounded floating point number. (Information Technology - Microprocessor Systems - Floating-Point Arithmetic, International Standard, ISO/IEC/IEEE 60569: 2011. Geneva: ISO, 2011, pp. 13-14) | |
| 102 | width e | is the width, e, of the exponent E Field 51. | |
| 103 | width b | is the width, b, of the bound B Field 52. | |
| 104 | width t | is the width, t, of the T Fields 53 (FIG. 1), 53R (FIG. 5) | |
| 105 | width d | is the width, d, of the lost bits D Field 54. | |
| 106 | width n | is the width, n, of the N Field 55. | |
| 107 | width c | is the width, c, of the C Field 56. | |
| 108 | width r | is the width, r, of the R Fields 57 (FIG. 1), 57R (FIG. 5). | |

GLOSSARY

| No. | Name | Description |
|---|---|---|
| | | FIGS. 2A & 2B |
| 200 | bounded floating point addition/subtraction diagram | is the data and control flow diagram of the apparatus and method for computing the exemplary bounded floating point addition and subtraction operations, which can also be applied to other mathematical operations. |
| 201 | first operand | data from the first operand register 210 of the registers 990 (where a register may be a hardware register, a location in a register file, or a memory location) conforming to the bounded floating point format 100 for an addition operation and the minuend for a subtract operation. |
| 202 | second operand | data from the second operand register 220 of the registers 990 (where a register may be a hardware register, a location in a register file, or a memory location) conforming to the bounded floating point format 100 for an addition operation and the subtrahend for a subtract operation. |
| 210 | first operand register | is the register (where a register may be a hardware register, a location in a register file, or a memory location) that contains the first operand 201 in the bounded floating point format 100. |
| 220 | second operand register | is the register (where a register may be a hardware register, a location in a register file, or a memory location) that contains the first operand 202 in the bounded floating point format 100. |
| 50A | first operand sign bit S Field | is the S Field of the first operand 201. |
| 51A | first operand exponent E | is the E Field of the first operand 201. |
| 52A | first operand bound B | provides the inventive bound B Field 52 for the first operand 201. |
| 53A | first operand significand T | is the T Field of the first operand 201. |
| 50B | second operand sign bit S Field | is the S Field of the second operand 202. |
| 51B | second operand exponent E | is the E Field of the second operand 202. |
| 52B | second operand bound B | Provides the inventive error bound for the second operand. |
| 53B | second operand significand T | is the T Field of the second operand 202. |
| 230 | first significand swap multiplexer | selects the significand of the operand with the smallest exponent 53D from either the first operand significand T 53A or the second operand significand T 53B controlled by the largest exponent control 302. |
| 231 | second significand swap multiplexer | selects the significand T of the operand with the largest exponent E 53E from either the first operand significand T 53A or the second operand significand T 53B controlled by the largest exponent control 302. |
| 53D | significand T of the operand with the smallest exponent E | is the significand T of the operand with the smallest exponent E that is modified by the insertion of the hidden bit H 510 with the modified significand left justified. |
| 53E | significand T of the operand with the largest exponent E | is the significand T of the operand with the largest exponent E that is modified by the insertion of the hidden bit H 510 with the modified significand left justified. |
| 240 | alignment shifter | shifts the significand T of the operand with the smallest exponent E 53D to the right by the number of bits determined by the exponent difference 321. In this invention, this shift may shift off lost bits and the associated bound must be adjusted (see FIG. 4, Dominant Bound Logic). Bits shifted out of the end of the alignment shifter are inserted into the least significant bit of the result of the alignment shifter. |
| 241 | aligned significand T of the operand with the smallest exponent E | is the aligned significand T of the operand with the smallest exponent E. |
| 242 | alignment shift loss | is a one bit shifted out of the alignment shifter 240. When this occurs, a one bit is inserted into the aligned significand T of the operand with the smallest exponent E 241 ensuring that a significand excess 741 will be detected. |
| 250 | significand adder | calculates the sum or difference 251 of the aligned significand T of the operand with the smallest exponent E 241 and the significand T of the operand with the largest exponent E 53E. |
| 251 | sum or difference | is the sum or difference of the aligned significand T of the operand with the smallest exponent E 241 and the significand T of the operand with the largest exponent E 53E. |

GLOSSARY

| No. | Name | Description |
|---|---|---|
| 51C | result exponent E | is the final value of the exponent after normalization adjustment. |
| 52C | result bound B | is the bound to be included in the final result. |
| 53C | truncated resulting significand T | is the significand of the result of the operation rounded to zero. |
| 260 | calculated result | is the final calculated result as the concatenation of the result sign bit S 50C, the result exponent E 51C, the result bound B 52C, and the truncated resulting significand T 53C. |
| 261 | BFP zero | is zero in the bounded floating point representation. |
| 262 | sNaN(isb) | is the bounded floating point representation of NaN (Not a Number, insufficient significant bits). |
| 270 | exception and result multiplexer | selects the bounded floating point result 280 from either the calculated result 260, BFP zero 261, or sNaN(isb)262 based on the zero selection control 821 or sNaN selection control 811. |
| 280 | bounded floating point result | is the final bounded floating point result value stored in the final result register 285 of the registers 990 (where register may be a hardware register, a location in a register file, or a memory location) of the operation, a bounded floating point value, zero, or NaN. |
| 285 | final result register | is a register of the registers 990 (where register may be a hardware register, a location in a register file, or a memory location) containing the bounded floating point result 280. |
| 290 | sign logic | determines the result sign bit S 50C from the first operand sign bit S 50A and the second operand sign bit S 50B and the right shift control 702 (the effect on the sign after subtraction). |
| 50C | result sign bit S | is the sign of the calculated result 260. |

FIG. 3

| No. | Name | Description |
|---|---|---|
| 300 | exponent logic | calculates the exponent difference 321 and identifies the largest exponent control 302. |
| 301 | exponent comparator | compares the first operand exponent E 51A with the second operand exponent E 51B to determine the largest exponent control 302. |
| 302 | largest exponent control | is the control signal identifying the largest of the first operand exponent E 51A or the second operand exponent E 51B and controls the first and second significand swap multiplexers 230, 231, the largest and smallest exponent selection multiplexers 310, 311, and the first and second bound swap multiplexers 401, 402. |
| 310 | largest exponent selection multiplexer | selects either the largest exponent E 51D from first operand exponent E 51A or the second operand exponent 51B controlled by the largest exponent control 302. |
| 311 | smallest exponent selection multiplexer | selects either the smallest exponent E 51E from the first operand exponent E 51A or the second operand exponent E 51B controlled by the largest exponent control 302. |
| 51D | largest exponent E | is the largest of the first operand exponent E 51A and the second operand exponent E 51B determined by largest exponent control 302. |
| 51E | smallest exponent E | is the smallest of the first operand exponent E 51A and the second operand exponent E 51B determined by largest exponent control 302. |
| 320 | exponent subtractor | calculates the exponent difference 321 between the largest exponent E 51D and the smallest exponent E 51E. |
| 321 | exponent difference | is the magnitude of the difference between the first operand exponent E 51A and the second operand exponent E 51B and controls the alignment shifter 240. In this invention the lost bits subtractor 410 also subtracts the exponent difference 321 from the count portion of the smallest exponent operand bound B 52D to produce the adjusted bound of the operand with smallest exponent B 52F. |

FIG. 4

| No. | Name | Description |
|---|---|---|
| 400 | dominant bound logic | uses the first operand bound B 52A, the second operand bound B 52B, the largest exponent control 302, and the exponent difference 321 to determine the dominant bound B 52H. In an arithmetic operation, the operand with the least number of significant digits determines ("dominates") the number of significant digits of the result. |
| 401 | first bound swap multiplexer | selects either the smallest exponent operand bound B 52D from first operand bound B 52A or the second operand bound B 52B controlled by the largest exponent control 302. |
| 402 | second bound swap multiplexer | selects either the largest exponent operand bound B 52E from the first operand bound B 52A or the second operand bound B 52B controlled by the largest exponent control 302. |
| 52D | smallest exponent operand bound B | is the bound of the operand with the smallest exponent. |
| 52E | largest exponent operand bound B | is the bound of the operand with the largest exponent. |
| 54A | smallest exponent operand bound lost bits D | is the lost bits D portion of the smallest exponent operand bound B 52D. |

-continued

GLOSSARY

| No. | Name | Description |
|---|---|---|
| 55A | smallest exponent operand bound B accumulated rounding error N | is the accumulated rounding error portion of the smallest exponent operand bound B 52D. |
| 410 | lost bits subtractor | subtracts the exponent difference 321 from the smallest exponent operand bound lost bits D 54A producing adjusted smallest exponent operand bound lost bits D 54B. |
| 54B | adjusted smallest exponent operand bound lost bits D | is the smallest exponent operand bound lost bits D 54A adjusted by the exponent difference 321 to account for the increase in the significant bits of the operand with the smallest exponent operand bound B 52D due to alignment. |
| 52F | adjusted bound of the operand with smallest exponent B | is the concatenation of the adjusted smallest exponent operand bound lost bits D 54B and the smallest exponent operand bound accumulated rounding error N 55A. |
| 420 | bound clamp | prohibits the adjusted bound of the operand with smallest exponent B 52F from underflowing to less than zero when the lost bits subtractor 410 produces a negative value for the adjusted smallest exponent operand bound lost bits D 54B. This limits the clamped bound B 52G to zero or greater. |
| 52G | clamped bound B | is the adjusted bound of the operand with smallest exponent B 52F limited to zero or greater. |
| 430 | bound comparator | compares largest exponent operand bound B 52E to the clamped bound B 52G to determine the dominant bound control 431. |
| 431 | dominant bound control | controls the dominant bound multiplexer 440 to select the dominant bound B 52H. |
| 440 | dominant bound multiplexer | selects either the largest of the largest exponent operand bound B 52E or the clamped bound B 52G to determine the dominant bound B 52H. |
| 52H | dominant bound B | is the largest of the largest exponent operand bound B 52E and the clamped bound B 52G. This is the bound of the operand with the least number of significant bits after alignment. |
| | | FIG. 5 |
| 500 | post normalization result format | is the format of the bounded floating point significand adder result 720 after normalization. |
| 501 | virtual width of significand adder | is the width of the resulting sum or difference taking into account possible need for multiple additions necessary to accommodate extended bounded floating point formats. |
| 510 | hidden bit H | is the left justified hidden bit H Field 510 after normalization. |
| 53R | resulting normalized significand T | is the resulting significand after normalization. This result is truncated (round to zero) to form the final result significand T. This field is t bits in width. |
| 57R | resulting rounding bits R Field | is a field (of width r 108) holding the most significant bits of the resulting significand that are lost due to truncation. These bits are used to accumulate rounding error. |
| 60R | extended rounding error X Field | is a field (of width x 502) holding the bits of the result lost due to truncation, which is to the right of the R Field 57R in the format. These bits will provide something similar to a "sticky bit." |
| 502 | extended rounding error width x | is the virtual width, x, of the X Field 60R. |
| | | FIGS. 6A and 6B |
| 600 | main bound logic | calculates the result bound B 52C from the dominant bound B 52H, the carry adjusted bound B 52M, and the number of leading zeros 711. |
| 54C | dominant bound lost bits D | is the data in the lost bits D Field 54 of the dominant bound B 52H. |
| 55B | dominant bound accumulated rounding error N | is the accumulated rounding error N Field 55 of the dominant bound B 52H. |
| 610 | lost bits adder | adds the number of leading zeros 711 to the dominant bound lost bits D 54C to obtain the adjusted lost bits D 54D. When a significand is shifted left to normalize (cancellation), insignificant bits are shifted in from the right increasing the number of lost bits in the result. |
| 54D | adjusted lost bits D | is the dominant bound lost bits D 54C adjusted by the number of leading zeros 711. |
| 52J | cancellation adjusted bound B | is the concatenation of the adjusted lost bits D 54D and the dominant bound accumulated rounding error N 55B. |
| 620 | cancellation detector | asserts cancelation control 621 when there is cancellation by determining that the number of leading zeros 711 is greater than one. An add operation with like signs may require a one bit right shift. |

GLOSSARY

| No. | Name | Description |
| --- | --- | --- |
| 621 | cancellation control | is the control signal indicating that cancellation has occurred as determined by the cancellation detector 620 controlling the result of the result bound multiplexer 630. |
| 630 | result bound multiplexer | selects either the incremented adjusted bound B 52J or the carry adjusted bound B 52M depending on whether cancellation occurred (cancellation control 621). This determines the result bound B 52C. |
| 640 | count adder | adds the significand excess 741 to the dominant bound accumulated rounding error N 55B and the normalized rounding R 57A yielding the updated accumulated rounding error N 55C. |
| 55C | updated accumulated rounding error N | is the dominant bound accumulated rounding error N 55B adjusted by the significand excess 741. |
| 56A | updated accumulated rounding error extension count C | is the extension count 56 portion of the updated accumulated rounding error N 55C. |
| 650 | count comparator | compares the updated accumulated rounding error extension count C 56A to the dominant bound lost bits D 54C to produce the count overflow 651. |
| 651 | count overflow | is asserted when the updated accumulated rounding error extension count C 56A is greater than or equal to the dominant bound lost bits D 54C indicating that a single bit of significance is lost due to rounding. When updated accumulated rounding error extension count C 56A and the dominant bound lost bits D 54C are both zero, the count overflow 651 is not asserted. |
| 660 | lost bits incrementer | adds one to the dominant bound lost bits D 54C when the count overflow 651 is asserted. |
| 54E | incremented lost bits D | is the dominant bound lost bits D 54C adjusted by the count overflow 651. |
| 52K | count adjusted bound B | is the bound comprised of the concatenation of the dominant bound lost bits D 54C with the updated accumulated rounding error N 55C. |
| 52L | lost bits adjusted bound B | is the bound comprised of the concatenation of the incremented lost bits D 54E, a one for the value of the C Field 56, and the normalized rounding R 57A. |
| 670 | adjusted bound multiplexer | selects either the lost bits adjusted bound B 52L when count overflow 651 is asserted or the count adjusted bound B 52K producing the carry adjusted bound B 52M. |
| 52M | carry adjusted bound B | is the bound adjusted for potential rounding error selected between the count adjusted bound B 52K and the lost bits adjusted bound B 52L. |

FIG. 7

| No. | Name | Description |
| --- | --- | --- |
| 700 | normalization logic | produces the truncated resulting significand T 53C, the result exponent E 51C, the number of leading zeros 711, the significand excess 741, and the carry detection 701 from the sum or difference 251 and the largest exponent E 51D. |
| 701 | carry detection | determines whether the sum or difference 251 had a carry out requiring a right shift to normalize, right shift control 702. |
| 702 | right shift control | controls whether the sum or difference 251 must be shifted right to normalize. Controls the right shifter 703. |
| 703 | right shifter | when indicated by the right shift control 702, shifts the sum or difference 251 right one bit producing the right shift result 704. The result is modified by the right shift loss 705. |
| 704 | right shift result | is the result after normalizing the sum or difference 251 determined by the right shift control 702. When the right shift control 702 is not asserted the right shift result 704 is equal to the sum or difference 251. |
| 705 | right shift loss | is a one bit (a true bit) shifted out of the right shift result 704. When this occurs, a one bit is inserted into the right shift result 704 ensuring that a significand excess 741 will be detected. |
| 710 | most significant zeros counter | counts most significant zeros of the sum or difference 251 necessary to normalize by shifting left. Produces the number of leading zeros 711 to control the left shifter 712 and to contribute to the computation of the result exponent E 51C. |
| 711 | number of leading zeros | is the number of most significant leading zeros. Controls the left shifter 712 and the cancellation detector 620. |
| 712 | left shifter | shifts the right shift result 704 left the number of bits specified by number of leading zeros 711 required to normalize the right shift result 704 to produce the normalized result 720. If the most significant zeros counter 710 results in no leading zeros, the normalized result 720 is equal to the right shift result 704. |

GLOSSARY

| No. | Name | Description |
|---|---|---|
| 720 | normalized result | is the result of normalizing the sum or difference 251. |
| 730 | exponent normalization adder | adjusts the largest exponent E 51D for normalization. When the right shift control 702 is asserted one is added to the largest exponent E 51D; otherwise the number of leading zeros 711 is subtracted from the largest exponent E 51D. Either case produces the result exponent E 51C. |
| 57A | normalized rounding R | is the most significant r bits 108 of the normalized result 720 that are lost due to truncation. |
| 60A | normalized extension X | is the x 502 inventive bits of the normalized result 720 to the right of the normalized rounding R 57A created by alignment or normalization but lost due to truncation. |
| 740 | excess significand detector | creates the logical OR of all bits of the normalized extension X 60A producing the significand excess 741. |
| 741 | significand excess | is the logical OR of all bits of the normalized extension X 60A. |

FIG. 8

| No. | Name | Description |
|---|---|---|
| 800 | exception logic | determines zero control 821 and sNaN selection control 811 from the result bound B 52C, the unacceptable bound limit 804, and the significand capacity 805. |
| 801 | operation width control | is a signal provided by the processor indicating the width of the current bounded floating point operation in the form of an address. |
| 802 | bound limit memory | is an optionally dynamic memory containing the unacceptable limit for the result lost bits D 54F. Initialized to default values or by an optional special command to reset to default values. A special optional processor command may set the contents of the bound limit memory 802 to custom limits for lost significant bits. Memory is addressed by the operation width control 801. |
| 803 | significand capacity memory | is a static memory that provides the size of the significand (t + 1) for the width of the current operation. Memory is addressed by the operation width control 801. |
| 804 | unacceptable bound limit | is the unacceptable limit (from the bound limit memory 802) for the result lost bits D 54F selected by the current operation width control 801. |
| 54F | result bound lost bits D | is the data in the lost bits D Field 54 portion of the result bound B 52C. |
| 805 | significand capacity | is the number of bits representing the significand, including the hidden bit H 510, in the operands of the current bounded floating point operation. |
| 810 | sNaN detection comparator | asserts the sNaN selection control 811 when the result lost bits D 54F is greater than or equal to the unacceptable bound limit 804. |
| 811 | sNaN selection control | is the signal provided to the exception and result multiplexer 270 to select sNaN(isb) 262 as the bounded floating point result 280. |
| 820 | zero detection comparator | asserts the zero selection control 821 when the results lost bits D 54F is greater than or equal to the significand capacity 805. |
| 821 | zero selection control | is the signal provided to the exception and result multiplexer 270 to select zero as the bounded floating point result 280. |
| 830 | limit write instruction | is optional bounded floating point instruction providing an elective write control. This instruction stores a programmed bound limit 831 into the bound limit memory 802 into an address determined by the operation width control 801. |
| 831 | programmed bound limit | is a value provided by an optional bounded floating point instruction. This bounded floating point instruction stores an unacceptable bound limit 804 value in the bound limit memory 802 in a location determined by the operation width control 801. |
| 832 | bound limit memory default reset control | is an optional control signal from an optional special bounded floating point instruction that resets all bound limit memory 802 locations to the default bound limit 833. |
| 833 | default bound limit | is a default value (having a pre-determined value for each precision) stored in the bound limit memory 802 in a location determined by the operation width control 801. |

FIG. 9

| No. | Name | Description |
|---|---|---|
| 900 | bounded floating point system | is a system for computing numbers in bounded floating point format consisting of a main processing unit 910 with associated registers 990 and communicating with a bounded floating point unit (BFPU) 950. |
| 910 | main processing unit | executes internal instructions accessing data 201, 202, 831, 280 from, and to, a plurality of registers 990 (where a register may be a hardware register, a location in a register file, or a memory location) and outputs commands and data 201, 202, 831. |
| 930 | bounded floating point operation instruction | a bounded floating point arithmetic instruction such as multiply, subtract, or the exemplar bounded floating point add operation. |
| 940 | sNaN(isb) exception | a bounded floating point signaling NaN processor exception generated based on sNaN selection control 811. |

| No. | Name | Description |
|---|---|---|
| 950 | bounded floating point unit (BFPU) | is the portion of the bounded floating point system 900 that executes bounded floating point operation instructions 930 on the first operand 201 and the second operand 202 producing the bounded floating point result 280 and the sNaN(isb) exception 940, when insufficient significant bits remain in the result or executes the limit write instruction 830 establishing the unacceptable bound limit 804. |
| 990 | registers | is a plurality of registers (where a register may be a hardware register, a location in a register file, or a memory location). Provides storage for the bounded floating point first input operand 201, the bounded floating point second input operand 202, bounded floating point result (280), and the programmed bound limit 831. |

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A processing device comprising:
a plurality of registers (990);
a main processing unit (910) operable to execute internal instructions and output FPU instructions (930, 830, 831);
a bounded floating point unit (BFPU) (950) communicably coupled to said main processing unit (910); wherein said BFPU (950) comprises a first operand register (210), a second operand register (220), a final result register (285); an exception and result multiplexer (270), an sNaN detection comparator (810), and a result bound multiplexer (630);
wherein said first operand register (210) accommodates a first operand (201) in a bounded floating point format (100); wherein said bounded floating point format (100) comprises a sign bit S Field (50), an exponent E Field (51), a bound B Field (52), and a significand T Field (53); wherein said bound field (52) comprises a lost bits D Field (54) and an accumulated rounding error N Field (55); wherein said accumulated rounding error N Field (55) comprises a rounding error count C Field (56) and a rounding bits R Field (57);
wherein said second operand register (220) accommodates a second operand (202) in said bounded floating point format (100);
wherein said final result register (285) accommodates a bounded floating point result (280) in said bounded floating point format (100);
wherein said BFPU (950) receives at least two BFPU instructions (930, 830) from said main processing unit (910), wherein said BFPU instructions (930, 830) comprise a floating point operation instruction (930) and a bound limit selection instruction (830, 832);
wherein said BFPU (950) generates a calculated result (260) value from applying an operation of said floating point operation instruction (930) on said first operand (201) and said second operand (202);
wherein said result bound multiplexer (630) generates a result bound B (52C) error value using a cancellation adjusted bound B (52J) accumulated cancellation error and a carry adjusted bound B (52M) accumulated rounding error;
wherein said sNaN detection comparator (810) generates, when there are insufficient significant bits in said calculated result (260) value, a sNaN selection control signal (811) signaling insufficient significant bits;
wherein said exception and result multiplexer (270) selects said bounded floating point result (280) value from among one of said calculated result (260) value, a representation of sNaN(isb) (262), a bounded floating point representation of BFP zero (261), based on said sNaN selection control signal (811) or a zero selection control (821); and
wherein said BFPU (950) writes said bounded floating point result (280) value to said final result register (285).

2. The processing device as recited in claim 1, wherein said bound limit selection instruction comprises one of: a bound limit memory default reset control (832) instruction and a limit write control (830) instruction to set a programmed bound limit (831) value.

3. The processing device as recited in claim 1, wherein said exception and result multiplexer (270) selection of said bounded floating point result (280) value comprises:
selecting said BFP zero (261) if said zero selection control (821) is asserted;
selecting said sNaN(isb) (262) if said sNaN selection control signal (811) is asserted; and
selecting said calculated result (260) if neither said zero selection control (821) or said sNaN selection control (811) is asserted.

4. The processing device as recited in claim 1, wherein said BFPU (950) further comprises a first bound swap multiplexer (401) for selecting from either a first operand bound B (52A) or a second operand bound B (52B) to generate a smallest exponent operand bound B (52D).

5. The processing device as recited in claim 1, wherein said BFPU (950) further comprises a second bound swap multiplexer (402) for selecting from either a second operand bound B (52B) or a first operand bound B (52A) to generate a largest exponent operand bound B (52E).

6. The processing device as recited in claim 1, wherein said BFPU (950) further comprises a lost bits subtractor circuit (410) for subtracting an exponent difference (321) from a smallest exponent operand bound lost bits D (54A) to produce an adjusted smallest exponent operand bound lost bits D (54B).

7. The processing device as recited in claim 4, wherein said BFPU (950) further comprises:
- a second bound swap multiplexer (402) for selecting from either said second operand bound B (52B) or said first operand bound B (52A) to generate a largest exponent operand bound B (52E); and
- a lost bits subtractor circuit (410) for subtracting an exponent difference (321) from a smallest exponent operand bound lost bits D (54A) to produce an adjusted smallest exponent operand bound lost bits D (54B).

8. The processing device as recited in claim 5, wherein said BFPU (950) further comprises a dominant bound multiplexer (440) that selects a dominant bound B (52H) from either said largest exponent operand bound B (52E) or a clamped bound B (52G).

9. The processing device as recited in claim 7, wherein said BFPU (950) further comprises a dominant bound multiplexer (440) that selects a dominant bound B (52H) from either said largest exponent operand bound B (52E) or a clamped bound B (52G).

\* \* \* \* \*